(12) United States Patent
Walker et al.

(10) Patent No.: US 7,933,893 B2
(45) Date of Patent: Apr. 26, 2011

(54) METHOD AND SYSTEM FOR PROVIDING A LINK IN AN ELECTRONIC FILE BEING PRESENTED TO A USER

(75) Inventors: Jay S. Walker, Ridgefield, CT (US); Daniel E. Tedesco, Huntington, CT (US); John M. Packes, Hawthorne, NY (US); Stephen C. Tulley, Monroe, CT (US); Kieth Bemer, Pittsburgh, PA (US); Dean P. Alderucci, Westport, CT (US); Marc D. Kessman, Pound Ridge, NY (US); James A. Jorasch, New York, NY (US)

(73) Assignee: Walker Digital, LLC, Stamford, CT (US)

( * ) Notice: Subject to any disclaimer, the term of this patent is extended or adjusted under 35 U.S.C. 154(b) by 106 days.

(21) Appl. No.: 11/421,669

(22) Filed: Jun. 1, 2006

(65) Prior Publication Data
US 2007/0073773 A1    Mar. 29, 2007

Related U.S. Application Data

(63) Continuation of application No. 11/267,873, filed on Nov. 4, 2005, which is a continuation-in-part of application No. 09/606,422, filed on Jun. 29, 2000, now abandoned.

(60) Provisional application No. 60/202,390, filed on May 8, 2000.

(51) Int. Cl.
*G06F 7/00* (2006.01)
(52) U.S. Cl. ..................... 707/717; 707/944
(58) Field of Classification Search .......... 707/1, 100, 707/102, 944, 717, 999.001; 705/10, 26
See application file for complete search history.

(56) References Cited

U.S. PATENT DOCUMENTS 5,418,908 A    5/1995 Keller et al.
(Continued)

FOREIGN PATENT DOCUMENTS

EP    0810 520 A1    12/1997
(Continued)

OTHER PUBLICATIONS

Wingfield, Nick, "Supersearch Engine Has Big Horsepower", Apr. 29, 1996, CNET News.com, (http //www news com/news/ item0,4,1206,00 html), 2 pp.
(Continued)

*Primary Examiner* — Mohammad Ali
*Assistant Examiner* — John P Hocker
(74) *Attorney, Agent, or Firm* — Fincham Downs, LLC; Carson C. K. Fincham

(57) ABSTRACT

A method for providing a link in an electronic file being presented to a user which includes defining a customized viewpoint for the user. The viewpoint includes a preference for the user that provides an association between a data pattern and a computer network resource. The method also includes generating a request for content, receiving an electronic file in response to the request, and evaluating the electronic file to recognize a match between at least one portion of the electronic file and the data pattern. Upon recognizing a match, the electronic file is modified to include a link to the computer network resource associated with the matching data pattern, and the modified electronic file is presented to the user. Thus, the link included in the electronic file presented to the user is customized for the user, and different users who retrieve the same content can be provided with links to different computer network resources depending on their respective viewpoints.

50 Claims, 13 Drawing Sheets

U.S. PATENT DOCUMENTS

| | | | |
|---|---|---|---|
| 5,442,771 A | 8/1995 | Filepp et al. | |
| 5,446,891 A | 8/1995 | Kaplan et al. | |
| 5,499,329 A | 3/1996 | Motoyama et al. | |
| 5,537,314 A | 7/1996 | Kanter | |
| 5,572,643 A | 11/1996 | Judson | |
| 5,603,025 A | 2/1997 | Tabb et al. | |
| 5,617,565 A | 4/1997 | Augenbraun et al. | |
| 5,634,062 A | 5/1997 | Shimizu et al. | |
| 5,640,560 A | 6/1997 | Smith | |
| 5,649,186 A | 7/1997 | Ferguson | |
| 5,664,948 A | 9/1997 | Dimitriadis et al. | |
| 5,694,594 A | 12/1997 | Chang | |
| 5,706,434 A | 1/1998 | Kremen et al. | |
| 5,708,825 A | 1/1998 | Sotomayor | |
| 5,712,979 A | 1/1998 | Graber et al. | |
| 5,717,860 A | 2/1998 | Graber et al. | |
| 5,717,923 A | 2/1998 | Dedrick | |
| 5,740,428 A | 4/1998 | Mortimore et al. | |
| 5,740,549 A | 4/1998 | Reilly et al. | |
| 5,745,360 A | 4/1998 | Leone et al. | |
| 5,745,909 A | 4/1998 | Perlman et al. | |
| 5,752,022 A | 5/1998 | Chiu et al. | |
| 5,764,906 A | 6/1998 | Edelstein et al. | |
| 5,790,793 A | 8/1998 | Higley | |
| 5,794,210 A | 8/1998 | Goldhaber et al. | |
| 5,794,257 A | 8/1998 | Liu et al. | |
| 5,801,702 A | 9/1998 | Dolan et al. | |
| 5,802,299 A | 9/1998 | Logan et al. | |
| 5,802,530 A | 9/1998 | Van Hoff | |
| 5,809,242 A | 9/1998 | Shaw et al. | |
| 5,809,317 A | 9/1998 | Kogan et al. | |
| 5,812,769 A | 9/1998 | Graber et al. | |
| 5,813,020 A | 9/1998 | Hohensee et al. | |
| 5,815,830 A | 9/1998 | Anthony | |
| 5,819,285 A | 10/1998 | Damico et al. | |
| 5,822,539 A | 10/1998 | Van Hoff | |
| 5,826,025 A | 10/1998 | Gramlich | |
| 5,848,397 A | 12/1998 | Marsh et al. | |
| 5,855,008 A | 12/1998 | Goldhaber et al. | |
| 5,890,137 A | 3/1999 | Koreeda | 705/26 |
| 5,903,889 A | 5/1999 | de la Huerga et al. | |
| 5,905,991 A | 5/1999 | Reynolds | |
| 5,918,014 A | 6/1999 | Robinson | |
| 5,933,811 A | 8/1999 | Angles et al. | |
| 5,937,392 A | 8/1999 | Alberts | |
| 5,940,595 A | 8/1999 | Reber et al. | |
| 5,948,061 A | 9/1999 | Merriman et al. | |
| 5,970,230 A | 10/1999 | Huck | |
| 5,974,398 A | 10/1999 | Hanson et al. | |
| 5,999,912 A | 12/1999 | Wodarz et al. | |
| 5,999,929 A | 12/1999 | Goodman | 707/10 |
| 6,006,265 A | 12/1999 | Rangan et al. | |
| 6,009,462 A | 12/1999 | Birrell et al. | |
| 6,014,502 A | 1/2000 | Moraes | |
| 6,014,634 A | 1/2000 | Scroggie et al. | |
| 6,016,504 A | 1/2000 | Arnold et al. | |
| 6,018,748 A | 1/2000 | Smith | 715/501.1 |
| 6,021,418 A | 2/2000 | Brandt et al. | 715/205 |
| 6,029,141 A | 2/2000 | Bezos et al. | |
| 6,061,660 A | 5/2000 | Eggleston et al. | 705/14 |
| 6,070,149 A | 5/2000 | Tavor et al. | 705/26 |
| 6,092,074 A * | 7/2000 | Rodkin et al. | 707/102 |
| 6,122,647 A | 9/2000 | Horowitz et al. | |
| 6,189,030 B1 | 2/2001 | Kirsch et al. | 709/224 |
| 6,289,362 B1 | 9/2001 | Van Der Meer et al. | 715/273 |
| 6,301,617 B1 | 10/2001 | Carr | 709/227 |
| 6,345,293 B1 | 2/2002 | Chaddha | 709/219 |
| 6,381,597 B1 | 4/2002 | Lin | 707/3 |
| 6,405,174 B1 | 6/2002 | Walker et al. | 705/14 |
| 6,507,865 B1 | 1/2003 | Hanson et al. | |
| 6,546,397 B1 * | 4/2003 | Rempell | 707/102 |
| 6,606,652 B1 | 8/2003 | Cohn et al. | |
| 6,628,314 B1 | 9/2003 | Hoyle | |
| 6,687,737 B2 | 2/2004 | Landsman et al. | |
| 2001/0013009 A1* | 8/2001 | Greening et al. | 705/10 |
| 2002/0038350 A1 | 3/2002 | Lambert et al. | |
| 2002/0147625 A1* | 10/2002 | Kolke, Jr. | 705/9 |
| 2002/0152126 A1 | 10/2002 | Lieu et al. | |
| 2004/0064471 A1 | 4/2004 | Brown et al. | |
| 2004/0148366 A1 | 7/2004 | Ross, Jr. et al. | |
| 2005/0182773 A1* | 8/2005 | Feinsmith | 707/100 |
| 2007/0150496 A1* | 6/2007 | Feinsmith | 707/100 |

FOREIGN PATENT DOCUMENTS

| | | |
|---|---|---|
| WO | WO 97/21183 | 12/1997 |
| WO | WO 98/34168 | 8/1998 |
| WO | WO 98/58334 | 12/1998 |

OTHER PUBLICATIONS

Hammond, Eric, "Beta; Xudynamic Web Publishing Server; Story Server Channels Content", Jan. 6, 1997, Info World, Section: Intranet World; at p. IW/1, 4 pp.

Jackson, Jackie, "Suncoast Information Specialists", Sep. 1997, Info Newsletter, vol. 11, No. 5, 7 pp.

"ABA Experts Debate Choosing Between Wordperfect & Word", Sep. 1998, Law Office Management & Administration Report, Section: at p. 10, 5 pp.

"Software News; Talking Web Browser for the Blind Now Available from IBM", Feb. 7, 1999, (http www2 software ibm com/news/news nsf/n/alme44vjxf), 2 pp.

"Autonomy Debuts Portal-in-Box", Feb. 8, 1999, PCWeek Online, (http //www zdnet com/pcweek/stories/news/ 0,4153,388671,00,html), 2 pp.

"Delphi Forums Announces Next-Generation Web Community Platform Designed to Deliver Optimum Marketing Value; New Platform and Tools Allow Delphi Partners to Create Customized Web Communities and Marketing Techniques", Feb. 23, 1999, PR Newswire, Section: Financial News, 2 pp.

Devanbu, P. et al., "CHIME: Customizable hyperlink insertion and maintenance engine for software engineering environments", Software Engineering, Proceedings of the 1999 International Conference on . . . , Publication date: 1999, ISBN: 0-58113-074-0, 1 page.

"Alexa Internet Integrates Related Links and Archive of the Web into Internet Explorer 5 Release; Alexa Related Information Visible Part of Internet Infrastructure", Mar. 18, 1999, Business Wire, 2 pp.

Glascock, Stuart, "IE 5 Finally Hits the Street" Mar. 22, 1999, Computer Reseller News, 1 page.

Fleischer, Jo, "Geocities' Home Page to Make Paid Referrals to Web Retailers", Retail Tech Magazine, Apr. 1999, pp. 49-50.

"Incremental Value Checklist", Download date: Apr. 2, 1999, (http // www Microsoft com/frontpage/2000/chklist htm), 5 pp.

"Screaming Media" ,, Download date: Apr. 6, 1999, (http //www interactive line com/products html), 1 page.

Krantz, Michael, "Spraypainting the Web; An Upstart Called Third Voice Thinks the Online World is Ready to Hear Another Opinion—Yours", Jun. 28, 1999, View Related Topics, Section: Technology, at p. 48, 2 pp.

"Cybercash and Netgravity Partner to Deliver 'One Click' Buying Within Banner Advertising and Marketing Offers", Jun. 28, 1999, (http //www biz yahoo com/bw990628/va_cyberca_1 html), 8 pp.

McHugh, Josh, "Wisecrack-Ware", Jul. 5, 1999, Forbes Magazine, (http //www forbes com/forbes/99/0705/640112a htm), 2 pp.

"Third Voice Updates System to Bolster Security; Third Voice Adds New Redundancies to Further Secure System, Protect User Privacy", Jul. 9, 1999, Business Wire, 2 pp.

"Third Voice.com", Download date: Jul. 14, 1999, (http //www thirdvoice com/about/index htm) 1p.

Warner, Melanie, "Keep Your Bleeping Notes Off my Site!; Cool? Says Who?", Jul. 19, 1999, Fortune, Section: Techno File/Infotech, at p. 116, 1 page.

Bosak, Jon and Bray, "XML and the Second-Generation Web", Scientific American, Dowload date: Jul. 28, 1999, (http //ww sciam com/1999/0599issue/0599bosak,html), 7 pp.

"Isoquest Announces NetOwl Desktop Preview 2; New Product Release", Download date: Jul. 28, 1999, (http //www techmall com/ techdocs/NP970819-2 html)2 pp.

"Autonomy—Knowledge Management and New Media Content Solutions", Download date: Aug. 7, 1999, (http //www autonomy com/knowledge/km_pibdatasheets html), 2 pp.

"Welcome to SRA International, Inc.", Download date: Aug. 7, 1999, (http //www sra com), 3 pp.
"SRA International, Inc.—Netowl Product Family Information", Download Date: Aug. 7, 1999, (http //www isoquest com/products_data html), 7 pp.
"Syntalex—Automatic Hypertext Linking and Cross-Referencing" Intelligent Text Processing, Download date: Aug. 7, 1999, (http //www syntalex com uk/services/acrl html), 3 pp.
"Context Website—Support—Development News—J-Link", Download date: Aug. 7, 1999, (http //www context co uk/support/development_jlink html), 2 pp.
"Syntalex—Intelligent Text Processing; Context Electronic Publishers", Download date: Aug. 7, 1999, (http //www syntalex co uk/casestudies/context html), 3 pp.
"Syntalex—Intelligent Text Processing", Download date: Aug. 7, 1999, (http //www syntalex co uk/about/about html), 1 page.
"Online and Database; Industry News", Download date: Aug. 7, 1999, (http //www onlineinc com/news/news7 html), 7 pp.
Gillmor, Dan, "Gurunet's Intriguing Net Journey", Sep. 4, 1999, (http //www gurunet com/press/990905_sv com/gillmor1 html), 5 pp.
"Gurunet.com Lauches First Instant Expert", Sep. 7, 1999, Internet Wire, (http www internetwire com/technews/tn/tn984111 dsl), 2 pp.
Bowman, Lisa M., "Company Brings Hyperlinks to New Level", Sep. 7, 1999, Yahoo News, (http //www dailynews yahoo com/h/zd/19990907/tc/19990907034 html), 2 pp.
"Flyswat—What is Flyswat?", Download date: Sep. 28, 1999, (http //www flyswat com), 1 page.
"Flyswat—Using flyswat", Download date: Sep. 28, 1999, (http //www flyswat com/using html), 1 page.
"Flyswat—What is Flyswat—Flyswat Privacy Policy", Download date: Sep. 28, 1999, (http //www flyswat com/privacy html), 4 pp.
"Nextchange; Commerce in Content", undated, 4 pp.
Office Action for U.S. Appl. No. 09/606,422, entitled "Method And System For Providing A Link In An Electronic File Being Presented To A User", in the name of Walker et al., mailed: Mar. 11, 2004, 49 pp.
Amendment and Response to the Office Action: U.S. Appl. No. 09/606,422, entitled "Method And System For Providing A Link In An Electronic File Being Presented To A User", in the name of Walker et al., mailed Jun. 14, 2004, 32 pp.
Office Action for U.S. Appl. No. 09/606,422, entitled "Method And System For Providing A Link In An Electronic File Being Presented To A User", in the name of Walker et al., mailed: Nov. 23, 2004, 74 pp.
Office Action for U.S. Appl. No. 09/606,422 mailed Nov. 23, 2004, 73 pp.
Office Action for U.S. Appl. No. 09/606,422 mailed Mar. 11, 2004, 41 pp.
Office Action for U.S. Appl. No. 11/421,690 mailed Sep. 27, 2007, 9 pp.
Office Action for U.S. Appl. No. 11/267,873 mailed May 2, 2008, 20 pp.
Office Action for U.S. Appl. No. 11/421,688 mailed Apr. 11, 2008, 20 pp.
Randall Rothenberg, "An Advertising Power, but Just What Does Doubleclick Do?"; The New York Times on The Web, Sep. 22, 1999, 9 pp.
"Doubleclick Receives Patent For Its Dart Technology; Patent Covers Method of Delivery, Targeting, and Measuring Advertising Over Networks", Doubleclick Press Releases—The Global Internet Advertising Solutions Company, Sep. 13, 1999, 2 pp.
"Welcome to the Natural Selection Advertising Network"; Natural Selection Advertising Network, (http://naturalselection.com/Adma/AM_Terms.cfm); download date Oct. 18, 1999, 4 pp.
"Dart for Advertisers Reclaim Control of Your Advertising"; (wysiwyg://49http://www.doubleclick.net/advertisers/closed-loop/ad_tracking/) download date Dec. 16, 1999, 2 pp.
7Search.com Affiliate's Program, (http pay-per-search.com/), download date Jan. 21, 2000, 4 pp.
"Advertisers and E-Mail Users Unite for Cash Rewards"; Business Wire, dated Nov. 23, 1999, 3 pp.
"Best Practices of Email Gurus"; DIALOGWEB, Dec. 6, 1999, Phillips Business Information, vol. 5, Issue 25, 4 pp.
"What is PayMail?", UtopiAD, Get Paid to Surf, (wysiwyg://176http://www.utopaid.com/getPaid/Mamber/newpmFAQ), download date Jan. 25, 2000, 3 pp.

"Corporate Profile for Amazing media, Inc.; dated Jan. 7", Business Wire, Jan. 7, 2000. 21 pp.
"AA1 Web Wizardree", The Most Inclusive & Useful Web Advertising & Promotion Site on the Web, (http://www.webwizardree.com/affiliate) download date Jan. 21, 2000, 5 pp.
"Banner Advertising Agents-Referral, and Affiliate Programs", (http:/www.free4free.com/associate/bannerad.htm); download date Jan. 21, 2000, 4 pp.
"Cash for Email, Earn Money Just for Reading Your Email!"; (hap://www.sendmoreinfo.com/cash.htm?Id=46774), Send More Info. Com, download date Jan. 25, 2000, 2 pp.
"E-mail, Microsites to Drive Internet Marketing Innovations (Credit card firms, including Citigroup and Discover Financial Services, start using opt-in e-mail marketing to achieve higher response rates and lower marketing costs)", DIALOGWEB, download date Jan. 26, 2000, 4 pp.
"Campaign Manager, Manage and Optimize Your Campaigns", The Adknowledge System, (http;//www.adknowledge.com/aksystem/campaign.html), download date Jan. 26, 2000, 2 pp.
"Site Registry, Registration Universal Tags Media Kits Blocking", Flycast.com, Jan. 26, 2000, 3 pp.
"Engage AdManager", Engage.com, download date Jan. 26, 2000, 10 pp.
"Google, How to Google, Google Search Tips", (http://www.google.com/help.html), download date Feb. 13, 2000, 7 pp.
"Our Company: Who We Are and What We Do", goto.com, download date Feb. 13, 2000, 3 pp.
"GuruNet, Your Instant Expert", (http://www,gurunet.com/index.html), download date, Feb. 13, 2000, 2 pp.
"Introducing A Faster Way to Search, It's as easy as 1 2 3", (http://www.lycos.com/seemore/Install.html), download date Feb. 13, 2000, 2 pp.
"MybnLink, Join the e-commerce revolution through email!", bn.com, download date Feb. 13, 2000, 2 pp.
"Welcome to ClickTheButton", (http://www clickthebutton.com), download date Feb. 13, 2000, 2 pp.
"Flyswat—Answers on-the-fly", (http:www.flyswat.com/c_new20.thml), download date Feb. 13, 2000, 3 pp.
"The Leader in Realtime Personalization", (http://www.netperceptions.com/product/home/0,1091,,00html); download date Feb. 13, 2000, 6 pp.
"Aurora Technology Group, E-Commerce/EDI Business Solutions", (www.aurora-its.com/ewallet.htm), download date Feb. 13, 2000, 2 pp.
"eWallet, Your Important Information: Secure & Convenient", (http://www.iliumsoft.com/walllet.htm), download date May 19, 2000, 3 pp.
Office Action for U.S. Appl. No. 11/267,873, mailed Dec. 2, 2008, 23 pp.
Office Action for U.S. Appl. No. 11/267,873, mailed Apr. 15, 2009, 22 pp.
Office Action for U.S. Appl. No. 11/267,873, mailed Dec. 3, 2009, 23 pp.
Office Action for U.S. Appl. No. 11/421,688, mailed Nov. 13, 2008, 20 pp.
Office Action for U.S. Appl. No. 11/421,688, mailed Apr. 15, 2009, 17 pp.
Office Action for U.S. Appl. No. 11/421,688, mailed Dec. 16, 2009, 21 pp.
Office Action for U.S. Appl. No. 09/583,706, mailed Oct. 10, 2002, 14 pp.
Office Action for U.S. Appl. No. 09/583,706, mailed May 9, 2003, 20 pp.
Office Action for U.S. Appl. No. 09/583,706, mailed Dec. 3, 2003, 47 pp.
Office Action for U.S. Appl. No. 09/583,706, mailed Jul. 14, 2004, 60 pp.
Office Action for U.S. Appl. No. 11/421,688, mailing dtae Jul. 22, 2010, 24 pp.
Office Action for U.S. Appl. No. 11/421,688 mailed Jan. 6, 2011, 27 pp.

* cited by examiner

USER ID : 58120 — 216, 234

| | DATA PATTERN NO. 1 240A | DATA PATTERN NO. N 240N | ADDRESS INFORMATION 242 | DISPLAY CODE 243 | EXPIRATION 244 | ORIGINATOR 246 | NUMBER OF TIMES ACCESSED 248 | NUMBER OF TIMES VISITED 249 | NUMBER OF TIMES ACCESSED SINCE LAST VISIT 250 | STATUS 252 | BENEFIT PER USE 254 |
|---|---|---|---|---|---|---|---|---|---|---|---|
| 260 → | BOOK | THE COMMITTEE | WWW.BOOKSTORE.COM | 1 | 12/31/02 | THIRD PARTY | 22 | 3 | 6 | ENABLED | $0.25 |
| 262 → | JUMP | JUMPING | 202.164.214.53 | 1 | N/A | USER | 86 | 15 | 14 | ENABLED | N/A |
| 264 → | SURF THE NET | SURFING THE NET | WWW.BROWSER.PUB.COM | 2 | N/A | DEFAULT | 2 | 2 | 0 | DISABLED | N/A |
| 266 → | SKATING | SKATING | WWW.SK8BOARD.COM | 3 | N/A | USER | 25 | 5 | 4 | ENABLED | $0.00 |
| 268 → | SODA | - | WWW.SODACO.COM | 4 | 12/15/02 | SODACO | 0 | 0 | 0 | DISABLED | $0.00 |
| 270 → | SOFTWARE | - | WWW.SOFTWARE.COM | 1 | 12/31/02 | DEFAULT | 6 | 2 | 2 | DISABLED | $0.10 |
| 272 → | SOFTWARE | - | WWW.D-VELOPER.COM | 1 | 1/31/03 | D-VELOPER | 4 | 3 | 0 | ENABLED | $0.15 |

| DISPLAY CODE 274 | PRESENTATION OF HYPERLINK WITHIN REQUESTED CONTENT 276 |
|---|---|
| 1 | CONVERT MATCHING DATA PATTERN INTO HYPERLINK |
| 2 | INSERT HYPERLINK AS A FOOTNOTE TO MATCHING DATA PATTERN |
| 3 | INSERT HYPERLINK IN A MARGIN ADJACENT TO MATCHING DATA PATTERN |
| 4 | INSERT HYPERLINK JUST AFTER MATCHING DATA PATTERN |

278 → (header row)
280 → row 1
282 → row 2
284 → row 3

FIG. 6

| USER ID 286 | USER NAME 288 | USER CONTACT INFORMATION 290 | USER ACCOUNT INFORMATION 292 | ACCUMULATED TOTAL (PAYMENT DUE) 294 |
|---|---|---|---|---|
| 10569 | JOHN ADAMS | 42 PARK AVE. NEW YORK, NY 10120 | VISA 5425-1300-9618-0010 | $15.75 |
| 58120 | SUSAN SMITH | 15 REDWOOD DR. SAN FRANCISCO, CA 94124 | AOL 5472369 | $7.50 |
| 42837 | JOE RICE | 26 OCEAN DR. MIAMI, FL 33012 | ECASH 14-269-527 | $14.00 |

FIG. 7

METHOD AND SYSTEM FOR PROVIDING A LINK IN AN ELECTRONIC FILE BEING PRESENTED TO A USER

CROSS-REFERENCES TO RELATED APPLICATIONS

The present application is a continuation of U.S. patent application No. 11/267,873, entitled "Method and System for Providing a Link in an Electronic File Being Presented to a User", filed Nov. 4, 2005 in the name of Walker et al;

which is a continuation-in-part of commonly-owned U.S. patent application No. 09/606,422, entitled "Method and System for Providing a Link in an Electronic File Being Presented to a User", filed Jun. 29, 2000 and now abandoned;

which claims the benefit of provisional U.S. Patent Application No. 60/202,390, entitled "Method and Apparatus for Displaying an Electronic File to a Requestor", filed on May 8, 2000.

Each of the above-referenced applications are incorporated herein by reference as part of the present disclosure.

The present application is related to now abandoned U.S. patent application Ser. No. 09/583,706, entitled "Method and System for Transmitting Data from a Destination to a User Over a Network Using a Variable Link", which was filed on May 31, 2000.

FIELD OF THE INVENTION

The invention relates to methods and systems for presenting electronic files to users. In particular, the invention relates to methods and systems for providing a link to a computer network resource in an electronic file being presented to a user.

BACKGROUND OF THE INVENTION

In recent years, the use of the Internet for a variety of purposes has expanded considerably. These purposes include research, communication, entertainment, and electronic commerce. As consumers and other users have connected to the Internet, commercial entities have increasingly sought to use the Internet as an advertising medium to present advertisements to those users.

Internet advertising methodology typically involves presenting banner advertisements (i.e., "banner ads") on documents retrieved from Web sites that experience high Volumes of Internet traffic. Banner ads may take a variety of forms, and often include a graphic displayed at a portion (e.g., the top) of a Web page. Banner ads may be managed by the administrator of a Web site or other entity (e.g., DoubleClick, Inc. of New York, N.Y.), and may be presented at times and/or under circumstances specified by the advertisers. Typically, an advertiser agrees to make a small payment to the administrator of a host Web site each time that a banner ad is presented to a user, and/or agrees to make a payment to the administrator whenever a user accesses the advertised content using the banner ad (e.g., by clicking on the banner ad using a mouse). Since different Web sites attract different segments of the consuming public, an advertiser often chooses to place its banner ads on particular Web sites based on an evaluation of which Web sites are likely to provide the greatest exposure to its potential customers.

At many Web sites, banner ads are presented to users in a "static" fashion, so that every user is presented with the same banner ads. At other Web sites, however, banner ads are presented to users in a "targeted" fashion, so that different users will be presented with different banner ads. For example, a Web site hosting a search utility may present a particular banner ad to a user based on the search terms entered by the user on the Web site. In this application, each potential advertiser may register for a particular keyword with the search utility such that, when a user enters a keyword on the Web site, the search utility will present the banner ad of the advertiser having registered for that keyword. For example, a casino resort may register the keyword "poker" such that a user who is searching for rules pertaining to a particular variation of poker may receive a tailored banner ad for the casino resort, along with the search results that were deemed to be pertinent by the search utility.

Although this form of Internet advertising has proven popular, it suffers from drawbacks. One drawback is that some advertisers who seek to advertise online have been unsuccessful in targeting their desired consumer audience. For example, some advertisers have been unable to find sufficiently popular Web sites that are relevant to the goods or services being advertised. Another drawback is that the cost of advertising through popular, well-known "portal" sites on the Internet, such as sites operated by large Internet service providers (e.g., AOL) or large searching/indexing services (e.g., EXCITE™, YAHOO!®, ALTAVISTA®, etc.), may be excessively expensive, particularly for a retailer of a wide range of products that wants to register many keywords, or for a retailer of a niche product who wants to advertise to a niche audience. Also, an advertiser may, because of budgetary or time constraints, choose only a subset of Web sites where its target consumers may be found. Further, Web site administrators may be burdened to tailor advertisements to each particular visitor, and may present advertisements indiscriminately or inefficiently, thereby reducing the value of these advertisements. Thus, current Internet advertising methods often fail to successfully connect advertisers with their targeted consumers.

There have also been proposals for collecting information about consumers in order to tailor advertisements and to deliver other content to the consumers based upon known or suspected preferences of the consumers. The proposals generally suggest collecting demographic information such as age, income, home address and occupation, and preference information such as favorite colors and preferred content delivery mode (e.g., audio or video). The information is then used to tailor delivery of information to the consumer by selecting from a variety of available content and advertisements provided by the Web site visited by the consumer or provided by an associated content or advertisement publisher. U.S. Pat. No. 5,717,923, issued Feb. 10, 1998 to Dedrick, discloses such an approach. Unfortunately, such approaches have not been widely used, perhaps due to the complexity and added effort required of a Web site administrator or Internet Service Provider ("ISP") to implement and administer such an arrangement, or due to privacy concerns arising from the use of consumer-specific information.

As part of efforts to optimize the interpretation and display of content posted on Web pages, Web browser software often provides a variety of "preference" settings by which a user may adjust various aspects of his or her browser software. These preferences may allow a user to control security settings of the browser software, to change the format of Web page display (e.g., color choices for displaying hyperlinks), or to change printing format(s). Browser software may also permit a user to store content received from a Web site, so that the content may be reviewed at a later time, or may be retrieved and manually modified (e.g., so the user can insert the content in a new file document or Web page). Browser software may further support the installation of third-party enhancements or "plug ins" to expand functionality of the browser software.

One "plug in" for browser software, which is referred to as "Flyswat" and is available from Flyswat, Inc., may be used to enhance Web pages being viewed with browser software to incorporate hyperlinks not included in the originally-authored Web page. These hyperlinks, for example, may provide cross-referencing from a product name to a vendor of that product. All Flyswat users, however, receive the same set of hyperlink enhancements, and thus all of the users are treated identically, much as in the case of static banner ads originated by Web site administrators. Thus, this "plug-in" enhancement fails to adequately target consumers that are being sought by particular advertisers.

SUMMARY OF THE INVENTION

An objective of the invention is to improve on the prior art to facilitate a more accurate presentation of information to targeted users in order to improve the efficiency of use of the Internet and Web sites thereon by users, Web site administrators and third parties. This objective is applicable to a variety of purposes including delivering advertisements to targeted consumers, and providing users with customized cross-references to network resources.

The invention is based on Applicants' recognition that benefits may be realized by enabling a party other than the author or administrator of content to alter or manipulate the content in a customized manner for a user, prior to or as part of delivery or display of the content to the user. The content may be customized for an individual user, a user belonging to a particular category or class, or a user who belongs to a particular organization. In one embodiment, a Web browser processes the content retrieved by a user, based on a viewpoint defined for the user, to insert at least one hyperlink into that content. Each hyperlink provides the user with a linkage, or cross-reference to a computer network resource.

One embodiment of the invention provides a method for providing a link in an electronic file being presented to a user. The method includes defining a customized viewpoint for the user that includes a preference for the user. The preference for the user provides an association between a data pattern and a computer network resource. The method also includes generating a request for content, receiving an electronic file in response to the request, and evaluating the file to recognize a match between at least one portion of the file and the data pattern. Upon recognizing a match, the file is modified to include a link to the computer network resource associated with the matching data pattern, and the file is presented to the user.

Another embodiment provides a method for cross-referencing content of a first data structure to a computer network resource. The method includes defining a customized viewpoint for a user that includes a preference for the user, the preference for the user providing an association between a data pattern and a computer network resource, locating the data pattern in the first data structure, and generating a second data structure including a link indicating the network resource associated with the located data pattern.

Another embodiment of the invention provides a system for providing a link in an electronic file being presented to a user. The system includes means for defining a customized viewpoint for the user that includes a preference for the user that provides an association between a data pattern and a computer network resource. The system further includes means for generating a request for content, means for receiving an electronic file in response thereto, means for evaluating the file to recognize a match between a portion of the file and the data pattern, means for modifying the file upon recognizing a match to include a link to the network resource associated with the matching data pattern, and means for presenting the file to the user.

Another embodiment of the invention provides a system for cross-referencing content of a first data structure to a computer network resource. The system includes means for defining a customized viewpoint for a user that includes a preference for the user, the preference for the user providing an association between a data pattern and a computer network resource, means for locating the data pattern in the first data structure, and means for generating a second data structure including a link indicating the computer network resource that is associated with the located data pattern.

BRIEF DESCRIPTION OF THE DRAWINGS

The invention will become more fully understood from the following detailed description, taken in conjunction with the accompanying drawings, wherein like reference numerals refer to like parts, in which:

FIG. 5 is a table representing an embodiment of the preference database of FIG. 3 or 4, populated by sample values for illustration only;

FIG. 6 is a table representing an embodiment of the display code database of FIG. 3 or 4, populated by sample values for illustration only;

FIG. 7 is a table representing an embodiment of the user account database of FIG. 4, populated by sample values for illustration only;

DETAILED DESCRIPTION

Definitions

Figure 1:
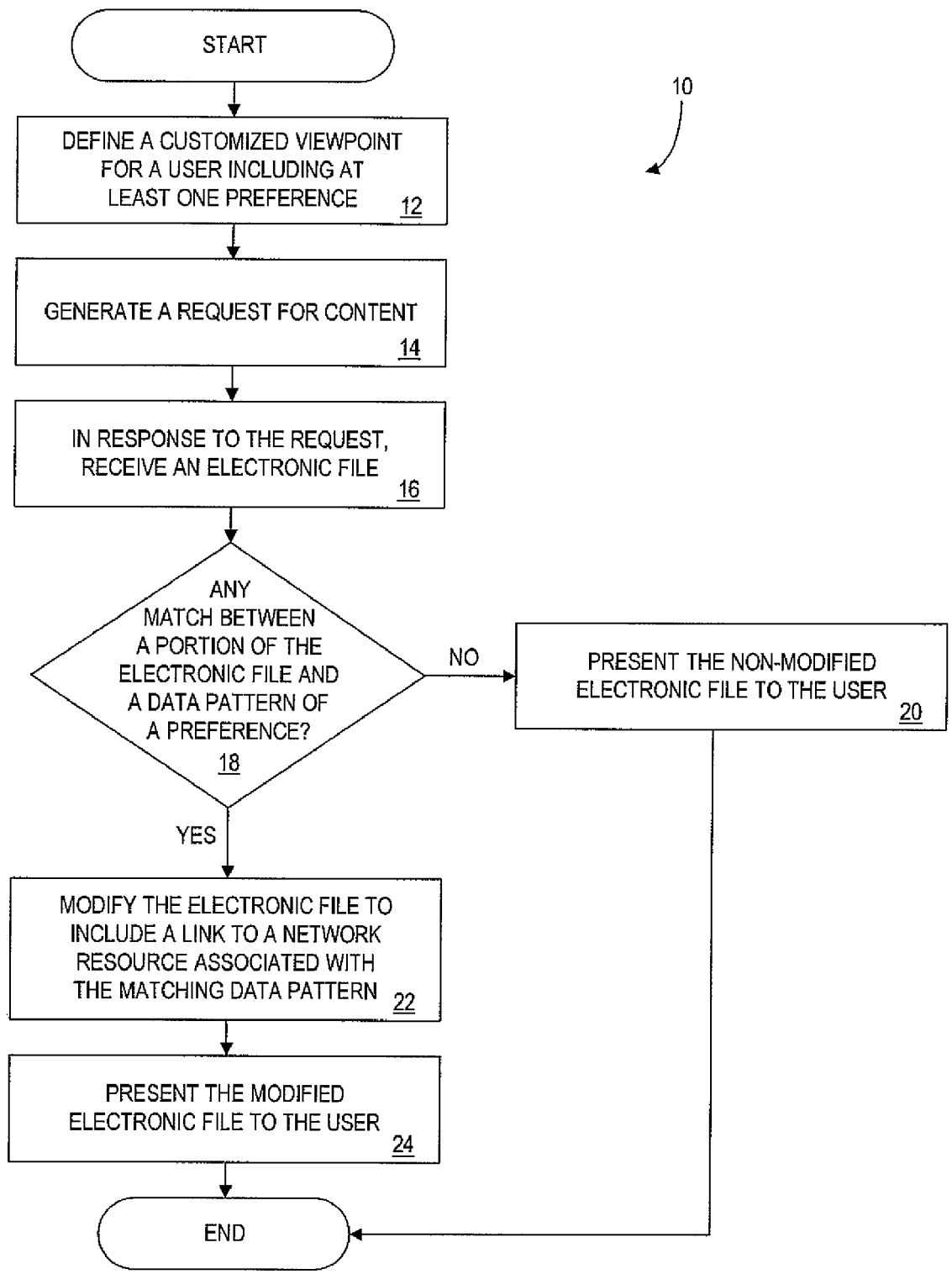
FIG. 1 is a flow chart representing an exemplary method for providing a link in an electronic file being presented to a user, in accordance with one embodiment of the present invention.

For the convenience of the reader in understanding the detailed description of the invention which follows, the following glossary provides definitions for various terms and acronyms used throughout the specification:

"Association" refers to a relationship between one object and another object, such as a relationship between a data pattern and the address (e.g., Uniform Resource Locator or "URL") of a computer network resource.

"Browser" refers to a computer program operable to access and display content. A browser operable to access and display content that resides on the World Wide Web is referred to as a "Web browser". A browser can typically access and display data formatted as hypertext, plain text, file lists accessible via the File Transfer Protocol ("FTP"), graphics, audio, multimedia, and other formats. A browser is also operable to access a computer network resource via activation of a hyperlink to that network resource.

"Computer network resource" refers to a resource available on a computer network. An example of a computer network resource includes, for example, a file, a Web page or site, an application, an applet, a script, etc. Each computer network resource is typically identified by an address (e.g., a "URL"), which can be associated with a hyperlink to provide a linkage or cross-reference to that particular resource.

"Content" refers to data (e.g., graphics, text, audio, video, a program, a file, a Web page, etc.) that is available from a computer server.

"Data pattern" refers to a recognizable arrangement of data that may be found in a requested electronic file. Typical data patterns may include one or more keywords, text patterns, graphic patterns, or other data patterns.

A "hyperlink" (also referred to as a "link") refers to a graphic, text or program element in a hypertext document that provides a linkage to a computer network resource. A text hyperlink is typically displayed using text of a predetermined color (e.g., blue) and/or attribute (e.g., underlining). A graphic hyperlink may be indicated by a graphic image. Hyperlinks are often used to provide linkages between Web pages or files.

"Markup Language" refers to a set of codes or tags embedded in a file that instruct a computer how to format the file for purposes of printing or display, as well as how to index and link the content of the file. A markup language, as presented, may incorporate a combination of files comprising graphics, text, programs, and/or cross-references. Markup languages include the Hypertext Markup Language (HTML), SGML, XML, VRML and NRML.

"Preference", used in the context of a viewpoint (as defined below), refers to an association made between one or more data patterns and a computer network resource. The network resource may be a Web page or site, an application, an applet, a script, or another resource, and the association may be between one or more data patterns and the address or URL of the resource.

"Uniform Resource Locator" or "URL" refers to an address for use in accessing a computer network resource on the Internet or other network. The address of a computer network resource is typically provided by its URL.

"Viewpoint" refers to a set of one or more preferences for a user. A viewpoint is used by a browser or other computer program to modify content delivered to a user by including a hyperlink to a computer network resource associated with any matching data pattern found within the content.

Exemplary Use

As a non-limiting, exemplary use of the invention, an advertiser seeking to target consumers may create one or more preferences, each defining an association between a computer network resource of that advertiser (e.g., a Web site where that advertiser's products are sold) and relevant data patterns. For example, a book retailer may create a preference providing an association between the title of a book, the name of an author and/or the word "book", and the address or URL of a Web page of that retailer's Web site where the book, a book by that author, or books in general, may be purchased. The retailer could then target advertisements to frequent book buyers by causing the insertion of these book-related preferences only into viewpoints used by frequent book buyers. At the same time, a movie retailer may create a preference providing an association between the title of a movie, the name of an actress and/or the word "movie", and the address of that retailer's Web site where that movie, a movie starring that actress, or movies in general, may be purchased. The movie retailer could then target advertisements by causing the insertion of the movie-related preferences into viewpoints used by other users. Customized viewpoints are thus defined for both sets of potential purchasers, with the viewpoints used by the frequent book buyers being customized to include the preferences from the book retailer, and the viewpoints used by the other users being customized to include the preferences from the movie retailer.

Using these customized viewpoints, the frequent book buyers will be provided with links to the book retailer in their retrieved content, while the other users will be provided with links to the movie retailer in their retrieved content, even in response to the same data pattern appearing in their retrieved content. As an example, assume that the book retailer stocks a book entitled "The Committee" by Mike Nugent, and the movie retailer stocks a movie of the same title. The book retailer may provide a preference defining an association between the data pattern "The Committee" and its Web site ("www.bookstore.com"), and insert this preference into the viewpoints used by the frequent book buyers. The movie retailer may provide a preference defining an association between the same data pattern (i.e., "The Committee") and its Web site, and insert this preference into the viewpoints used by the other users. If one of the frequent book buyers then requests a Web page including the data pattern "The Committee", he or she will be presented with a hyperlink to the Web site for the book retailer If one of the other users requests that same Web page, however, he or she will be presented with a hyperlink to the Web site for the movie retailer. Thus, the hyperlink presented to each user depends on the customized viewpoint for that user. (Note that the extra spaces in the URL addresses in this application prevent the URLs from being interpreted as embedded hyperlinks when this application is viewed.)

In this example, each retailer caused the insertion of the book- or movie-related preferences into the viewpoints used by frequent book buyers or other users. In one embodiment, the retailers may each have caused these insertions by offering money or other consideration to users to have the users agree to include the preferences into their own viewpoints. Each user was thus able to "customize" his or her viewpoint by deciding which offers to accept.

Description of Specific Embodiments

Referring to FIG. 1, a method 10 for providing a link in an electronic file being presented to a user includes defining a customized viewpoint for a user that include's a preference for the user, with the preference providing an association between a data pattern and a computer network resource (step 12), generating a request for content (step 14), and receiving an electronic file in response to the request (step 16). Method 10 further includes evaluating the electronic file to recognize a match between at least a portion of the file and the data pattern (step 18). If no match is found, the electronic file is presented (e.g., displayed) to the user without being modified (step 20). However, upon recognizing a match at step 18, the electronic file is modified to include a link to the computer network resource that is associated with the matching data pattern in accordance with the preference (step 22), and the modified file is presented to the user (step 24). The viewpoint for the user may include one or more preferences, each preference providing an association between one or more data patterns and a computer network resource.

At step 12, a customized viewpoint for a user that includes at least one preference can be defined in a variety of ways. In one embodiment, a customized viewpoint for a user is defined by a preference database stored at the user's computer. The preference database includes at least one preference, each defining an association between at least one data pattern and a computer network resource such as a Web page, a Web site, an application, an applet, a script, etc. When the user's computer receives an electronic file at step 16, the file may include one or more data patterns that match one or more of the data patterns stored in the preference database. Each matching data pattern is used to insert, into the file, a hyperlink to the computer network resource associated with the matching data pattern by a preference. Hypertext markup language, for example, may be used to insert such a hyperlink into the retrieved content.

A viewpoint may be "customized" for a user such that the viewpoint defined for the user may differ from another viewpoint defined for another user. Thus, a viewpoint may be customized for an individual user, or for a user belonging to a particular category, class, organization or other group of users. A viewpoint may be customized for a user in various ways. In one embodiment, a viewpoint is selected for a user from among a plurality of viewpoints based upon data that identifies the user, or based upon data that is provided by the user. For example, a viewpoint customized for frequent book buyers may be selected in response to a user entering information indicating an interest in buying books. According to another example, a user can use an input device to select a customized viewpoint from among a plurality of viewpoints stored on his or her computer, such as a first viewpoint providing at least one book-related preference and a second viewpoint providing at least one movie-related preference. These viewpoints may, for example, have been incorporated within the user's Web browser, or may have been installed at another time. Then, the user may use an input device to select the viewpoint that the user prefers. If the user prefers books to movies, the user may select the viewpoint providing the book-related preferences. The selected viewpoint may then be used for inserting hyperlinks into the content received by the user.

In another embodiment, an organization may establish one or more customized viewpoints to facilitate the ability of its members to conduct the business of the organization. For example, a corporation may establish a first viewpoint for use by its sales agents, and a second viewpoint for use by its engineers. The viewpoint selected for a particular user then depends on the category or class of users to which that user belongs. For example, the first viewpoint could be customized to include preferences defining associations between inventory item names and hyperlinks to the Web sites of particular suppliers from which the corporation typically buys such items, such that the sales agents would be provided with hyperlinks to these suppliers within any received content. The second viewpoint could be customized to include preferences defining associations between engineering keywords and links to corporate engineering specifications, so that the engineers would be provided with hyperlinks to these specifications within any received content. Schools, churches and other organizations could also establish one or more viewpoints for the use of its members. Viewpoints may also be customized based upon a characteristic of the user. For example, a chamber of commerce for a town could customize a viewpoint to include preferences defining associations between keywords (e.g., "restaurants") and network resources providing information about local businesses (e.g., "Joe's Pizza"). This viewpoint could be selected to provide local users with hyperlinks to the local businesses based on, for example, the zip code of the user, or the users' ISP for Internet access.

In another embodiment, viewpoints are automatically assigned to users. For example, data identifying the viewpoint selected for a user may be stored in a "cookie" file in the user's computer to allow the selected viewpoint to be automatically retrieved without interaction with the user. For another example, a viewpoint may be assigned automatically to a user based upon data about that user, such as data about the user's browsing history (e.g., if data indicates that a user frequently accesses book-related Web sites, then a viewpoint providing book-related preferences could be automatically assigned to the user). A viewpoint could also be automatically assigned to a user based upon other data associated with that user, such as demographic data (e.g., age, gender, address, occupation, income, interests, hobbies, etc. of that user).

The establishment of viewpoints and manipulation of content to include links to computer network resources associated with data patterns may be performed by a user's computer (e.g., a personal computer, personal digital assistant ("PDA"), a television with access to a wide area network, a computer terminal, etc.), or may be performed in whole or in part by a second computer in communication with the user's computer via a network (e.g., a local area network, a wireless network, a wide area network, a public switched telephone network, the Internet, etc.). For example, if a user receives content via a server operated by an ISP, that server can store viewpoints and/or manipulate content before providing that content to the user. Alternatively, a user can configure his computer system to allow any retrieved content to be processed by a third-party server, other than the user's ISP server. In another alternative, the user's ISP server, or a third-party server, stores viewpoints, which may be retrieved by the user's computer and used to manipulate content retrieved by the user.

In one embodiment, the retrieved content is user-displayable. In other embodiments, the retrieved content may be data that is not intended for user display, such as a database, an applet or a script (e.g., based upon the Java standard). In embodiments where the retrieved content is not displayed, links may also be inserted into the retrieved content so that they may be used by the recipient as part of evaluating the data, or executing the applet or script. For example, if content retrieved by a user includes an applet which will play a first sound (stored in file named "firstsound.au") according to the AudioClip interface in the Java applet package, the user's viewpoint could associate the first sound with a second sound (e.g., stored in a file "secondsound.au") such that, when the applet executes, the second sound is played rather than the first.

As links are inserted into retrieved content, an identification of the originator of the link may be provided in a tag of the link. The originator may be, for example, a party such as an advertiser or other commercial entity that established the viewpoint. The originator may also be a person, computer system, or browser that manually or automatically established the viewpoint. For example, a commercial entity seeking to establish a viewpoint may solicit a user to alter the user's viewpoint to include one or more added or alternate preferences in exchange for a payment, merchandise credit, discount, coupon or other benefit (e.g., a sweepstakes entry). After the user authorizes the alteration, hyperlinks may be inserted into content that is retrieved by the user in accordance with the altered preferences. Modifications may be solicited from other parties (e.g., a party that created the viewpoint or a prior preference, or that stores the viewpoint).

As links are generated and used, usage fields in a preference database may be updated to reflect the number of times that a hyperlink has been generated based upon a particular preference. The database may also be updated to reflect the number of times that a hyperlink generated from a particular preference has been used. The usage information can be used to delete, deactivate or otherwise change the status of the corresponding preference in the preference database after a predetermined number of uses. For example, a preference may be disabled once it has been used to insert twenty (20) hyperlinks into received content, or after a user has activated a hyperlink included within received content due to the preference a total of ten (10) times.

Preferences may also "age", such that their status changes with time. For example, an advertiser may offer to pay a user an amount of money in exchange for the user's agreement to include a particular preference in her viewpoint for a predetermined period of time. If the user accepts the offer, the preference is inserted into her viewpoint for use during that period, after which the preference is disabled. A commercial entity that solicits the inclusion of a particular preference may condition delivery of the offered payment, credit, discount, coupon or other benefit upon use of that preference for a predefined time period, the generation of a predetermined number of hyperlinks using the preference, a predetermined number of uses of hyperlinks generated by the preference, and/or use of the link for a specific purpose (e.g., a purchase).

Other information for each preference may also be stored in the preference database. For example, a geographic location may be identified to indicate where a preference may or may not be used. Exclusionary criteria may identify retrieved content for which a preference may not be used. One or more monetary values may be indicated, identifying a value for placement of the preference in the database, a value for insertion of a link derived from the preference, or a value for use of a hyperlink derived from the preference. The latter can be used to automatically create or provide payments, credits, discounts, coupons or other benefits that are due for the insertion of preferences, generation of links from preferences, or the use of links generated from preferences. Thus, the party that established a preference may be notified upon use of (i) the preference or (ii) a link derived therefrom, which may lead to an exchange of monetary value.

A given data pattern may be associated with multiple computer network resources. For example, multiple associations may occur if multiple commercial entities solicited the insertion of preferences into a viewpoint. In this situation, when the given data pattern is found in retrieved content, one of the preferences is selected, in a predetermined fashion or at random, with a link defined by the selected preference inserted into the content. Alternatively, an applet may be inserted into the content, permitting the user to select from among the multiple available associations for the matched data pattern.

In one embodiment, the invention is implemented in the form of a Web browser that is capable of dynamically providing hyperlinks in an electronic file being presented to a user. The browser resides locally within a user device, such as a personal computer, and is associated with a viewpoint which is customized for the user to include at least one preference for the user. The viewpoint may be implemented, for example, using a preference database for storing one or more preferences for the user. Each of the preferences provides an association between one or more data patterns and a computer network resource, such as a Web site, Web page, document, applet or script.

In response to receiving a request from a user to retrieve markup language-based electronic content, the browser performs a content retrieval routine. The content retrieval routine causes the browser to identify and access markup language-based electronic content identified by the user. Upon retrieval of the identified content, the browser examines the content for one or more data patterns defined by the viewpoint for the user. As a specific example, the browser evaluates the user-viewable text portion of the content and performs comparisons between the text found in this portion and one or more patterns identified by the preference database for the user's viewpoint. If the comparison yields a match between a data pattern stored in the preference database and a data portion of the requested content, the preference database is again accessed to retrieve an address or URL of a computer network resource that is associated with the matching data pattern. A hyperlink based upon this address is then incorporated into the content at or near the location of the matching data pattern, thereby altering the user-viewable text to reflect the hyperlink. The requested content, altered by incorporating any supplemental hyperlinks, is then stored and presented to the user by the user device.

In one embodiment, the indication of the hyperlink presented to the user represents the matched data pattern or keyword. Thus, the user may be presented with a hyperlink including the matched data pattern (e.g., "The Committee"), which appears in place of the text (e.g., "The Committee") in the unmodified electronic file. By activating the hyperlink, the user may be connected to the home page of the computer network resource (e.g., "www.bookstore.com"), or to a specific Web page of that computer network resource, that is associated with the matching data pattern (e.g., "www. bookstore. com/The_Committee"). The user may then purchase the book directly from that specific Web page in a known manner.

The preferences stored in the preference database that provide associations between data patterns and addresses of corresponding computer network resources, and which establish a viewpoint for use by a user, may be established by a publisher/developer of the Web browser, a user/installer of the browser, a third party such as an online merchant, service provider or portal type Web site wishing to influence Web traffic, and/or an administrator that wishes to establish certain associations for members of an organization, etc. The respective processes, and motivations for generating associations within the preference database, by the parties listed above are described below.

Additionally, it is envisioned that the disclosed Web browser may facilitate the provision of benefits to users and/or service providers in exchange for allowing the preference database to be updated by third parties. The benefits may be provided merely for allowing the preference database to be updated, in response to hyperlinks being generated based upon the updates, and/or in response to users activating the hyperlinks specified by the updates. The third party may be, for example, a service provider, an online merchant, or a portal-type Web site. The benefits provided to a user and/or service provider may include monetary payments, discounts and/or promotional offers.

Alternatively, benefits may be provided in exchange for allowing the installation of a software "plug-in", module or upgrade. A "plug-in" is an auxiliary software program used to enhance a browser to permit the access and display of additional file formats, such as Portable Document Format ("PDF"), Tagged Image File Format ("TIFF"), etc. An exemplary process by which benefits are provided is described in relation to FIG. 9.

Figure 2A:
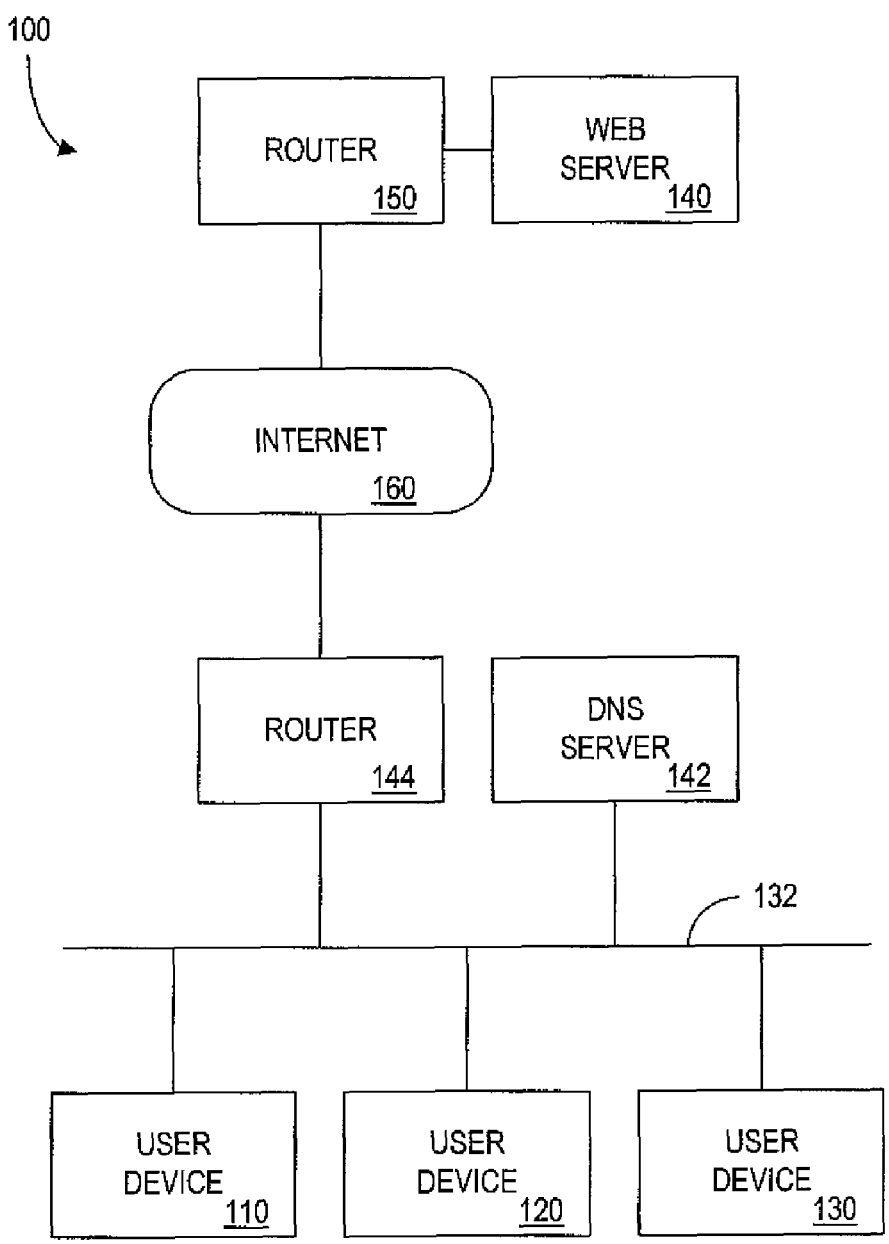
FIG. 2A is a block diagram illustrating an exemplary computer network environment suitable for implementing the method shown in FIG. 1.
Figure 2B:
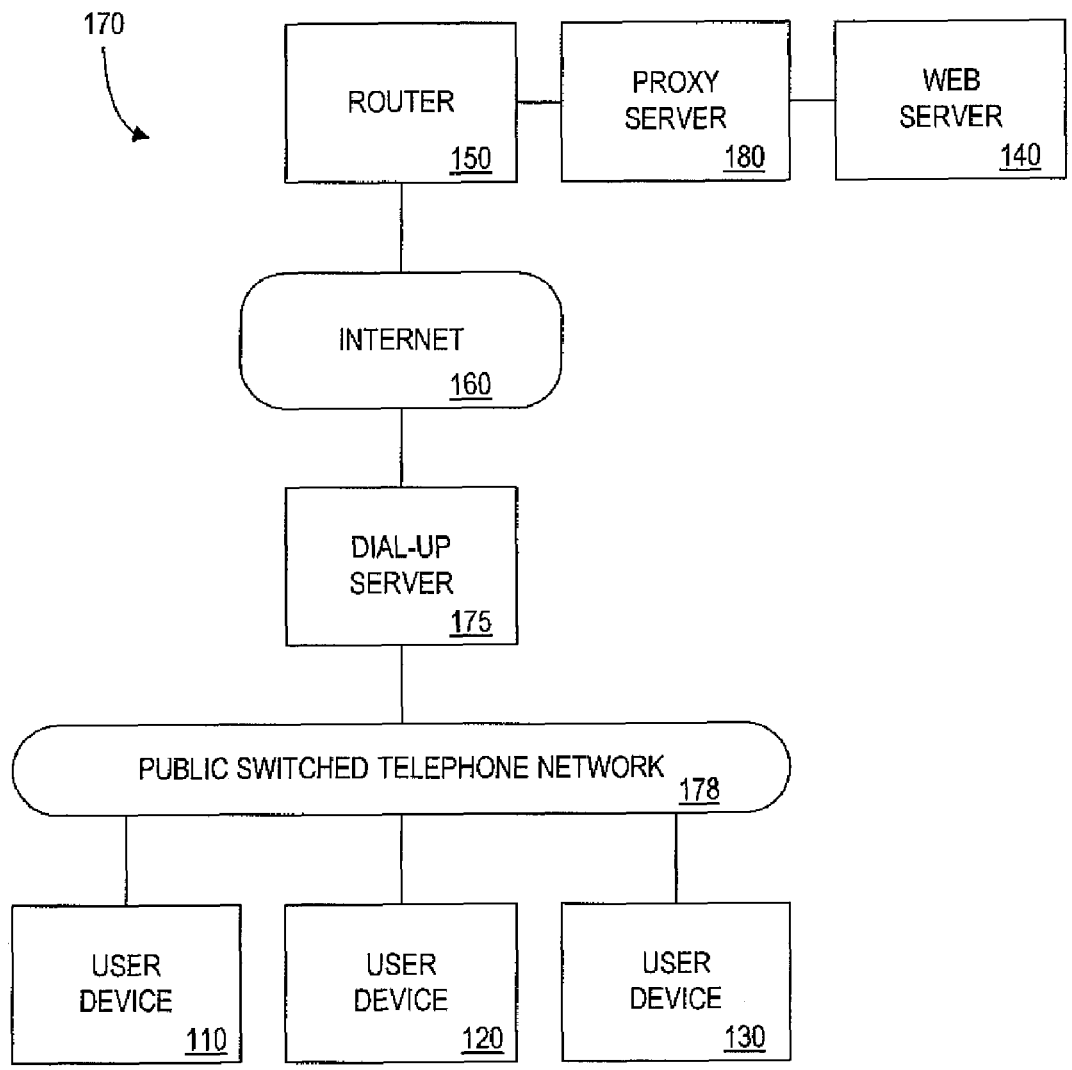
FIG. 2B is a block diagram illustrating an alternative computer network environment suitable for implementing the method shown in FIG. 1.

Method 10 can be implemented in various computer network systems such as the two network systems shown in FIGS. 2A and 2B. It will be understood by a person of skill in the art, however, that these two systems are merely illustrative examples of computer network systems in which method 10 may be implemented, and that method 10 may also be implemented in other computer network systems having other combinations of components.

Referring to FIG. 2A, method 10 can be implemented using a computer network 100 including a plurality of user devices 110, 120 and 130, with each user device residing at a node of a local area network ("LAN") 132. LAN 132 is a network of computers that exchange data, and share a common access portal to the Internet 160. Network 100 may include more or fewer than the three (3) user devices shown. Each user device 110-130 may include a personal computer, a personal digital assistant (PDA), a WebTV™ terminal, an Internet appliance, a cellular phone, or another device operative to communicate over a network, and to request, receive and present markup language-based files.

Each user device 110, 120 and 130 can generate a request for electronic content (step 14 of method 10), with the electronic content typically accessed based upon the address of that content, as is known in the art. In one embodiment, a user initiates a request for electronic content by entering (e.g., typing) its URL into an address bar area of the user interface of his or her Web browser. Then, the user device generates a request for the addressed content. For example, to initiate a request for book reviews on a Web page hosted on a Web server run by a newspaper (e.g., "City Times"), a user may enter the URL "www. citytimes. com/bookreviews" into the address bar area of the user's Web browser. A user may, alternatively, initiate a request for content by activating a hyperlink that has been presented to the user by user device 110, 120 or 130. For example, a user may activate a hyperlink (e.g., by "clicking" a mouse on the hyperlink) to initiate a request to retrieve the book reviews from the newspaper's Web server. In either case, the user device would generate an appropriate request for the content, which is communicated to a Domain Name System server ("DNS server") 142 via LAN 132 for evaluation by DNS 142. DNS server 142 is a computer server that operates name resolution software that allows users to locate computers on the Internet by their domain names.

As known in the art, DNS server 142 evaluates each requested address received from any of user devices 110, 120 or 130, and determines if the requested content must be accessed via a Wide Area Network ("WAN"), such as Internet 160. If the requested content must be accessed via Internet 160, the request is delivered via LAN 132 to a local router 144 for delivery to Internet 160. A router is an intermediary device in a communications network that facilitates the delivery of messages from transmitting to receiving devices. Internet routing protocols cause the request to be delivered to a host Web server 140 via a remote router 150. Web server 140 accesses the requested content and returns an electronic file containing that content to router 144 via router 150 and Internet 160. Router 144 relays the file to user device 10, 120 or 130 for presentation to the user. Thus, the user device 110, 120 or 130 receives the electronic file in response to the request (step 16 of method 10).

Upon receipt of the electronic file, but before displaying the file to the user, the Web browser causes user device 110, 120 or 130 to evaluate the file to recognize any match between at least a portion of the file and any data pattern stored as a preference by the browser (step 18 of method 10). If no match is found, the electronic file is presented (e.g., displayed) to the user without modification (step 20). However, upon recognizing a match, the user device modifies the file by including a hyperlink to a computer network resource that is associated with the matching data pattern by the preference (step 22), and then presents (e.g., displays) the modified electronic file to the user (step 24).

For example, after receiving an electronic file for the book review page from the newspaper's Web site, the user device may evaluate the user-viewable text portion of that file to recognize any match between any portion of the Web page and any of the data patterns stored as a preference for the user. In this example, assume that the customized viewpoint for the user includes a preference providing an association between the two data patterns "book" and "The Committee", and the address of an online book retailer (e.g., "www.bookstore-.com"). If no match is found, the electronic file is presented to the user without modification. However, if a match is found (e.g., "The Committee" is found in the content), the user device modifies the file by inserting a hyperlink to a computer network resource associated with the matched data pattern (e.g., "www. bookstore. com") and presents the modified file to the user with an indication of the hyperlink. If the user activates this link (e.g., by clicking on the link with a mouse), he or she may be connected to "www. bookstore. com", where the book "The Committee" can be purchased.

Referring to FIG. 2B, method 10 of FIG. 1 may also be implemented by a second computer network 170, wherein each user device 110, 120 and 130 can access Internet 160 via a dial-up account, in a known manner. Each of the user devices accesses a dial-up server 175 via a telephone connection of a Public Switched Telephone Network ("PSTN") 178. Typically, dial-up server 175 is maintained by an Internet service provider ("ISP"), such as "AMERICA ONLINE". Each user device uses a modem or other communication interface, and dial-up networking software, to communicate with dial-up server 175. Each user device may be a personal computer, a PDA, a WebTV™ terminal, a phone or other device to access a dial-up account, and to request, receive and present markup language-based content. Any or all of user devices 110, 120, 130 may alternatively access Internet 160 via other communication interfaces, such as Digital Subscriber Line ("DSL") and/or cable modem interfaces.

In computer network 170, each user device 110, 120, 130 can generate a request for the delivery of electronic content (step 14 of method 10), typically in the form of a URL, as is known in the art. Each request is delivered to dial-up server 175, which evaluates the requested URL and determines if the requested content must be accessed through a Wide Area Network (WAN) such as the Internet 160. If so, the request is delivered to Internet 160. Internet routing protocols cause the request to be delivered to a host Web server 140 via remote router 150 and a proxy server 180. In response, Web server 140 accesses and returns the requested content via proxy server 180, router 150 and Internet 160 to dial-up server 175, which relays an electronic file for the requested content to the requesting user device. Thus, that user device receives the electronic file in response to the request (step 16 of method 10). In contrast to the arrangement shown in FIG. 2A, the requests are delivered to Web server 140 via proxy server 180, which translates the addresses used by Internet 160 to addresses used by Web server 140, and thus insulates the addresses used by Web server 140 from external access. A proxy server similar to proxy server 180 could also be used in network 100 between Web server 140 and router 150, or between the user devices and router 144.

As in the embodiment shown in FIG. 2A, upon receipt of the electronic file but before displaying the file to the user (or before re-displaying the file to the user, as in a re-load or automatic refresh cycle), a Web browser causes the user device to attempt to recognize a match between at least a portion of the file and any data pattern stored as a preference by the browser (step 18). For example, the user device may determine if at least a portion of text in the user-viewable portion of the file matches a data pattern stored as a preference by the browser. If no match is found, the file is displayed to the user without modification (step 20). Upon recognizing a match, however, the user device modifies the file to include a hyperlink to a network resource associated with the matching data pattern (step 22), and presents the modified file to the user (step 24).

Figure 3:
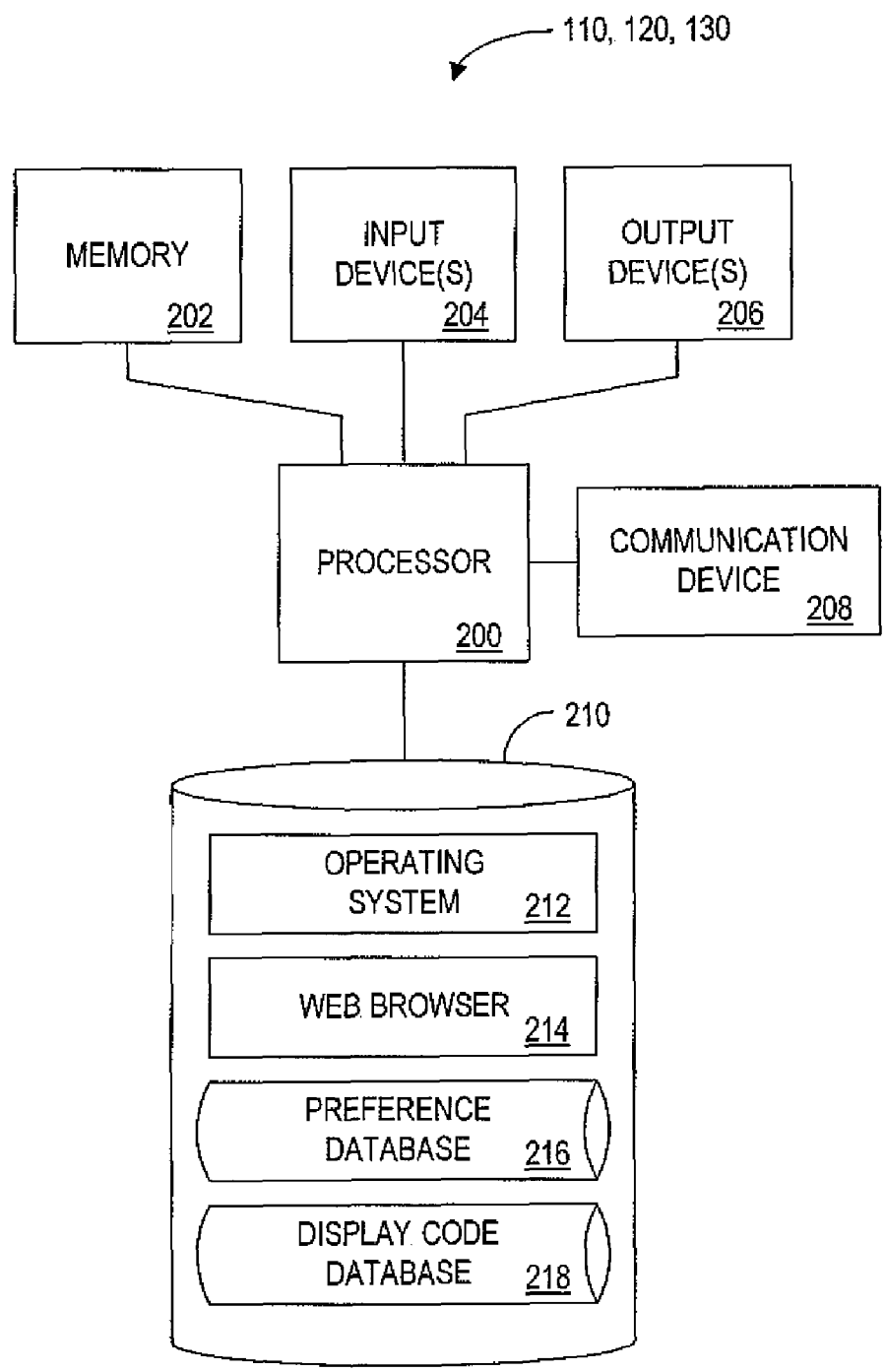
FIG. 3 is a block diagram illustrating an exemplary computer system which can serve as any of the user devices shown in FIGS. 2A and 2B.

Referring to FIG. 3, one embodiment of each of user device 110, 120 and 130 includes a processor 200 (e.g., a CPU or central controller) for executing instructions of computer programs and controlling operation of the user device 110, 120 or 130. Processor 200 has access to memory 202, such as random-access memory (RAM) and/or read-only memory (ROM) for storing programs, data, variables, and/or a basic input-output system (BIOS). Processor 200 receives input data from one or more input devices 204, and transmits output data to one or more output devices. Each input device 204 may include a mouse, a keyboard, a touch-screen, a microphone, a digital camera, a clock, etc. Each output device 206 may include a computer monitor, an audio circuit/speakers, a printer, etc. Processor 200 communicates with networked computers via a communication device 208. Device 208 may include a network interface card ("NIC") coupled to a LAN as in FIG. 2A, a modem in a dial-up embodiment such as in FIG. 2B, or another type of communication device or interface.

Processor 200 has access to a mass storage device 210 for storing objects such as programs and data. The stored objects may include an operating system ("OS") 212, a Web browser 214, a preference database 216, and a display code database 218. OS 212 may be, for example, MICROSOFT WINDOWS®, Linux, MAC O/S, UNIX, or another operating system.

In one embodiment, Web browser 214 provides functionality for inserting hyperlinks into retrieved electronic files. In particular, by executing instruction of Web browser 214, processor 200 is operable to generate a request for content (e.g., a markup language-based electronic file) from a Web server, and to receive, modify and present the requested content to a user. Processor 200 accesses preference database 216, which includes one or more records for storing one or more preferences. Each preference provides an association between one or more pre-registered data patterns (e.g., words, phrases and/or graphics that may occur in markup language-based files) and an address of a corresponding computer network resource. When processor 200 finds that the requested content includes a data pattern stored in preference database 216, it inserts a hyperlink to the network resource associated with the matching data pattern (step 22 of method 10). In one embodiment, the hyperlink is inserted in a manner which depends on a code stored in display code database 218, as described below.

Figure 4:
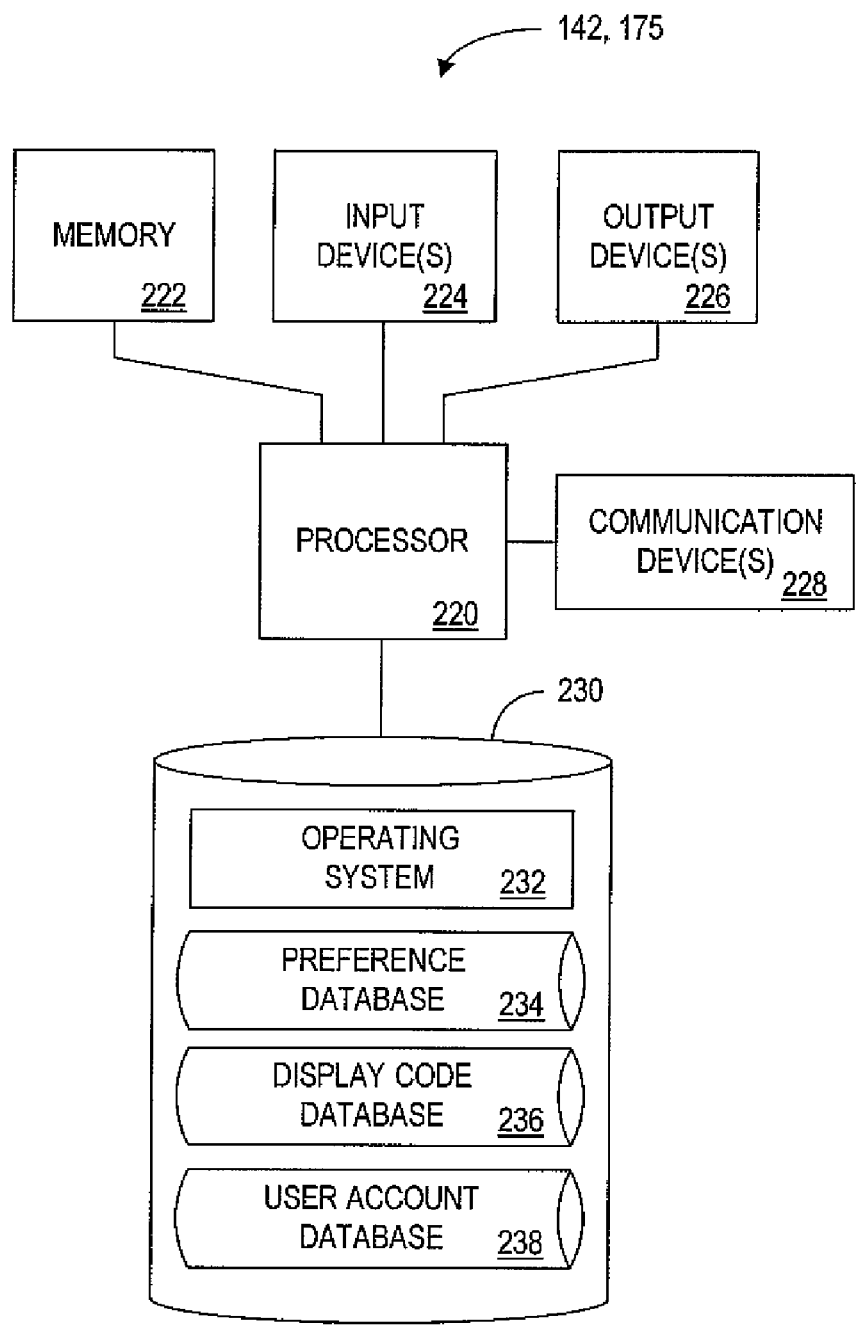
FIG. 4 is block diagram illustrating the Domain Name System server ("DNS server") shown in FIG. 2A or Dial-up Server shown in FIG. 2B.

Referring to FIG. 4, DNS server 142 (FIG. 2A) and dial-up server 175 (FIG. 2B) each may include a processor 220 to execute instructions of computer programs and to control operations of the respective server. Processor 220 has access to a memory 222, such as random access memory (RAM) or read only memory (ROM), for storage of computer programs, data and a basic input-output system (BIOS). Processor 220 receives input data from one or more input devices 224, and transmits output data to one or more output devices 226. Each input device 224 may include a mouse, a keyboard, a touch-screen, a microphone, a digital camera, a clock, etc. Each output device 226 may include a computer monitor, an audio circuit and speakers, a printer, etc. Processor 220 also communicates with networked computers via one or more communication device(s) 228. Device(s) 228 may include a network interface card (NIC) in a LAN embodiment such as shown in FIG. 2A, or one or more modems in a dial-up embodiment as shown in FIG. 2B.

Processor 220 has access to a mass storage device 230 which is configured to store objects such as programs and data. The objects stored on storage device 230 may include an operating system ("OS") 232 suitable for a network server. For example, OS 232 may be "MICROSOFT WINDOWS® NT", Linux, Unix, "NOVELL NETWARE", or another suitable operating system. Mass storage device 230 also stores shared file structures used by computers on the network, which may include documents of various forms created and shared by the members of the workgroup using the network. In one embodiment, the shared file structures include a preference database 234, a display code database 236, and a user account database 238. Each of these databases is accessible to processor 220 and other computers on the network.

Preference database 234, similar to preference database 216 (FIG. 3), includes one or more records for storing one or more preferences. Each preference provides an association between one or more pre-registered data patterns (e.g., words, phrases and/or graphics that may occur in markup language-based files) and the address of a corresponding computer network resource. The preferences stored in preference database 234 at DNS server 142 or dial-up server 175 are accessible to multiple users, each of whom may also have a separate preference database 216 stored on his or her user device. By storing preferences in server 142 or 175, the preferences may be provided to all of the members of a workgroup who are connected to server 142 or 175. The preferences stored within preference database 234 may be modified, for example, by a person responsible for managing the preferences for the entire workgroup (e.g., a manager, or an Information Technology employee). These preferences may also be modified by each user, if given permission to do so. If, however, a user wishes to add a preference for only his or her own use, the preference may be stored in preference database 216 rather than database 234. In that case, the user's Web browser 214 may retrieve preferences from both locally-stored preference database 216 and shared preference database 234.

In one embodiment, all of the preferences of a particular user are stored in preference database 234 of DNS server 142 or dial-up server 175. In this embodiment, all of the user's preferences are centralized in server 142 or 175, such that the user may use all of his or her preferences even with different user devices. In this embodiment, a user logging into the network software of server 142 or 175 could be provided with access to his or her preference database based upon a login identifier associated with that user.

When processor 200 or 220 determines that content requested by a user includes one of the data patterns stored within preference database 234, a hyperlink to the computer network resource that is associated with the matching data pattern is inserted in the electronic file for that content. In one embodiment, the hyperlink is inserted in a manner which depends on a display code stored within display code database 236, which is similar to display code database 218 (FIG. 3). The manner in which this occurs is described below.

In one embodiment, user account database 238 is provided for storing account data for users. User account database 238 is used for tracking the amount of payments or other benefits due to users in response to the use of preferences stored in preference database 216 or 234. For example, whenever user device 110, 120 or 130 inserts a hyperlink based on a preference into an electronic file being retrieved by a user device, and/or the user activates a hyperlink inserted within a file based upon a preference, the user device transmits an indication to DNS server 142 or dial-up server 175. That server then updates user account database 238 to reflect any additional payment or benefit due to the user. At the end of a billing cycle, the accumulated total of payments due to each user stored within user account database 238 is accessed to provide payment to each user. User account database 238 can also accumulate payments that are due to users for accepting offers to include preferences in their viewpoints.

Referring to FIG. 5, an exemplary structure of preference database 216 and/or 234 includes a plurality of records 260-272. Each record 260-272 includes a plurality of fields 240-254, and defines one preference. For each record 260-272, fields 240-254 include N data pattern fields 240A-240N, an address information field 242, a display code field 243, an expiration field 244, an originator field 246, a number of times accessed field 248, a number of times visited field 249, a number of times accessed since last visit field 250, a status field 252, and a benefit per use field 254. Database 216 or 234 may include other and/or less than all of these fields (e.g., database 216 may not include display code field 243 if hyperlinks are provided or displayed in a default manner).

For each record, fields 240A-240N define N data patterns that have been associated with the address stored in address information field 242. The N data patterns are numbered 1-N, with N being any integer greater than or equal to 1 (i.e., 1, 2, 3, . . . ). For example, fields 240A-240N of record 260 define two data patterns (i.e., N=2) that are associated with the URL "www.bookstore.com" (i.e., the address information stored in field 242). As shown in FIG. 5, a data pattern may have the form of a user-viewable text pattern (e.g., "book") that may occur within a retrieved electronic file. A data pattern may also have the form of a non-viewable pattern, such as a particular pattern found in a metatag, script, applet, graphic, or any other data found in retrieved content and describable by a data pattern.

As shown by records 268-272, a single data pattern stored within a single field (i.e., field 240A) may be associated with one address. For example, fields 240A-240N of record 268 indicate the data pattern "soda" is the only data pattern that is associated with the address "www.sodaco.com". Alternatively, as shown by records 260-266, multiple data patterns stored in multiple fields may also be associated with one address. For example, fields 240A-240N of record 260 indicate that two data patterns (i.e., "book" and "The Committee") have been associated with the address of "www.bookstore.com". Other fields may be used to store additional data patterns associated with one address. For example, additional fields (not shown) of record 260 could store the data patterns "soft-cover books" and "hard-cover books", each of which is associated with "www.bookstore.com" (in this example, N=4).

Alternatively, rather than or in addition to defining one or more specific data patterns associated with a single address, a computer-executable algorithm may be used to analyze received content to determine if that content includes any variation of one (or more) defined data patterns. This approach would allow for the automatic identification of multiple variations of a single data pattern. For example, assume that the data pattern "jump" is stored in a preference database. The algorithm could be applied to the words "jumped" and "jumping" in the retrieved content to determine that both of these words are variations of the stored data pattern "jump" since they share a common root (i.e., "jump"). The algorithm could also identify any other data patterns within the retrieved content (e.g., "jumps") which also share this common root. All of these words could then be associated with the address information associated with the word "jump". While this same result may be achieved by defining multiple data patterns including all of the variations of the common root, it may not always be easy or practical to predict all of the variations, in advance, for storage within fields 240A-240N of the preference database.

For each record in preference database 216 or 234, field 242 stores address information associated with the N defined data patterns. The address information may be in the form of a numeric IP address (e.g., field 242 of record 262 stores the numeric IP address 202.164.214.53). Alternatively, the address information may be a text-based URL that may later be submitted to DNS server 142 for conversion to a numeric IP address (e.g., field 242 of record 260 stores the text-based URL of "www.bookstore.com"). Address information field 242 may also store one or more markup language-based tags associated with the record. The tag may identify, for example, the originator of the record in the preference database (i.e., the party that added the record to the database), or may provide detailed information about the identified URL.

In FIG. 5, the address information stored in field 242 of each record 260-272 is independent, such that the N data patterns stored for each record is associated with an independent computer network resource. In this case, the address information stored in field 242 of one record may be different or the same as the address information stored in field 242 for any other record.

Alternatively, the address information stored within preference database 216 or 234 may be the same, or partially the same for every record. For example, an online bookstore could create a customized viewpoint that includes a record for each of a plurality of books, each record providing an association between the title of one of the books (stored in field 240A) and the URL of a Web site for that bookstore. The URL of the Web site for that bookstore may be stored in field 242 or, since the same URL would be associated with every record, the URL may be stored only once in database 216 or 234. According to another example, each record of the customized viewpoint could provide an association between the title of one of the books (stored in field 240A) and the URL of a Web page specific to that book (e.g., a Web page with that specific book already placed in an electronic shopping cart). In this case, the URL associated with each data pattern may include, for example, a base portion which is the same for all of the books and a variable portion specific to each book (e.g., "www.bookstore.com/The_Committee"). The online bookstore could then pay or provide benefits to frequent book purchasers for using the customized viewpoint. Then, when one of the frequent book purchasers retrieves an electronic file including any of the book titles stored in the preference database, the file presented to the user would be modified to include a hyperlink to the online bookstore. In this case, the viewpoint is customized for all of the frequent book purchasers.

Whenever an electronic file is modified to include a hyperlink to a computer network resource defined by a preference, the hyperlink will be inserted into the file in a particular manner. In one embodiment the hyperlink is inserted into the file in a default manner. For example, a hyperlink may be included in a file by "converting" the matching data pattern into the hyperlink. In another embodiment, the manner in which a hyperlink is included within a file will be determined by a display code that is stored within field 243. For example, based upon record 260, a hyperlink for "www.bookstore.com" will be included within an electronic file according to a display code of "1". The meaning of the various display codes is further described in relation to FIG. 6.

Expiration field 244 stores data indicating the expiration time or date, if any, for the preference represented by the corresponding record of the database. Expiration field 244 may identify a definitive "cut-off" date or time when the preference will be disabled or deleted, or an indication of an amount of time remaining before the corresponding record in the database is disabled or deleted. For example, field 244 of record 260 indicates that the preference providing an association between the data pattern "book" (field 240A) and the address information for "www.bookstore.com" (field 242) will expire on Dec. 31, 2002. User device 110 may store the expiration data in expiration field 244 at the time the record for the corresponding preference is created, based upon information provided by the party that establishes the preference. For example, the signal received by user device 110 at step 342 (see FIG. 9) may also include expiration information for a particular record that may be updated.

Alternatively, preference database 216 or 234 could store a range of dates or times during which a preference would, or would not, be effective. For example, preference database 216 or 234 may include a field which allows a particular association to occur on Saturdays and Sundays, but not weekdays, or to occur only during certain hours of the day. As another alternative, expiration field 244 could store data representative of a number of associations or presentations that will be made before the preference expires. For example, when a preference is stored within preference database 216, the value "100" could be stored in expiration field 244 for that preference, such that the preference will expire after it has been used to make 100 associations. In one embodiment, expiration information may be stored in field 244 using an expiration function. For example, the function "expire when field 249=10" would cause the corresponding preference to expire when the network resource pointed to by the address information has been visited 10 times.

Originator field 246 stores information generally or specifically identifying the originator of the corresponding preference. The originator is a party that generated the preference which defines the association between the data patterns in fields 240A-240N and the corresponding address information in field 242. In embodiments in which an originator is identified generally, field 246 may store any of a variety of general identifiers (e.g., "DEFAULT", "USER", "THIRD PARTY", etc.). "DEFAULT" indicates that the originator of the preference was the publisher or developer of the Web browser. "USER" indicates that the originator was the user, who may have generated and stored the association during an installation or update procedure for Web browser 214. "THIRD PARTY" indicates the originator was a third party (e.g., an online merchant, ISP, portal Web site, etc.) who generated and/or last updated the preference. Alternatively, rather than generally identifying the originator, field 246 may identify a specific originator. For example, field 246 of record 268 indicates that SODACO was the specific originator for that preference.

Fields 248, 249 and 250 store usage information for each of the preferences described by a record of the preference database. Field 248 stores data representing the number of times that each record has been accessed (i.e., the number of times that a Web browser has recognized that received content included data matching any of the N data patterns for that record). Field 249 stores data representing the number of times that the network resource for that record has been visited by the user. Field 250 stores data representing the number of times that each record has been accessed since the user last visited the network resource by activating a hyperlink generated using that record.

Fields 248 and 249 may be used to determine that a preference should expire after that preference has been used to insert a hyperlink a certain number of times, or after a resource has been visited a certain number of times, respectively. For example, the data in field 248 may be used by a browser to determine that a preference should expire after 100 links to an associated network resource have been incorporated into retrieved content, and the data in field 249 may be used to determine that a preference should expire after the user has visited the corresponding computer network resource 20 times. Thus, the data stored in fields 248-250 allows for accurate tracking and reporting of usage data for the preferences. This data can be supplied to, for example, the parties who were responsible for inserting the preferences into the preference database, for use in determining payments or benefits due to the user. Other usage fields may also be used, and fewer than all of fields 248-250 may be needed. For example, field 250 may not be needed in particular embodiments.

Figure 9:
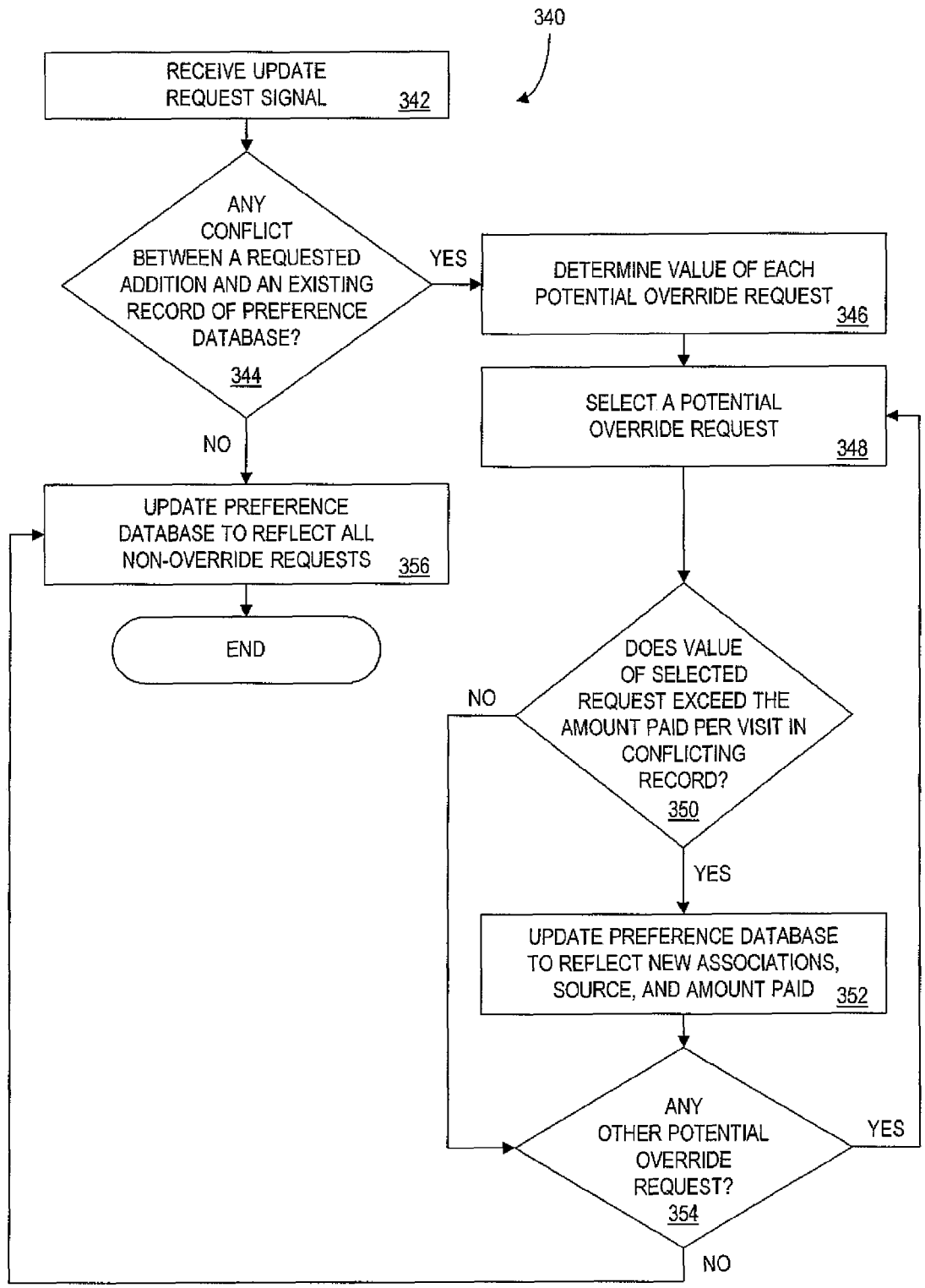
FIG. 9 is a flow chart of operations performed in updating the preference database of FIG. 5 in response to a user's acceptance of an offer.

Status field 252 stores, for each record, data representing a status for the corresponding preference. In one embodiment, the user may enable or disable each preference by changing the corresponding status data. When the status data represents "ENABLED", the preference is operational for use in modifying an electronic file to include a link to a computer network resource associated with a matching data pattern. When the status data represents "DISABLED", the preference is not operational for use in modifying an electronic file to include a link to a computer network resource associated with a matching data pattern. In another embodiment, the status of each preference may be overridden by, for example, a third party who wishes to update the preference database being used by a user One embodiment for overriding each preference is discussed below (FIG. 9).

Field 254 stores an indication of a benefit to be provided to the user per use of the corresponding preference. In one embodiment, field 254 stores an amount paid per visit representing an amount due to a user whenever the user activates a hyperlink generated using that preference to access the corresponding resource. Alternatively, instead of or in addition to providing an amount paid per visit, field 254 stores an amount paid per inclusion representing an amount due to a user whenever a hyperlink is inserted within retrieved content based upon that preference (regardless of whether the user actually activates the hyperlink).

The benefit provided to a user may be a monetary amount, coupon, points, frequent flyer miles, etc. The benefit may be provided by the party that inserted the preference, an organization to which the user belongs, the user's ISP (e.g., the benefit amount may be deducted from the user's ISP bill, or any other bill), or another party that was responsible for controlling the insertion of records into the preference database. Benefit per use field 254 may be used for controlling third-party insertion of records into the preference database. For example, if a third party wants to change address information associated with a data pattern already identified in the preference database, the third party may be required to offer a benefit per use that exceeds the benefit per use stored in field 254 of the corresponding record before being allowed to alter the address information. Field 254 may store an indication of a currency amount, or of some other benefit or value to be provided. Alternatively, field 254 may identify an index or ranking of a record that indicates the comparative value of the record as compared to other records.

In certain embodiments, the viewpoint defined by a particular preference database 216 or 234 is customized for a particular user, who may have a unique user identifier, such as that indicated by reference numeral 256. For example, the preference database 216 or 234 shown in FIG. 5 defines the viewpoint for a particular user who is identified by user identification number 58120. A different user having a different user identifier will use a different viewpoint. This customized preference database may, for example, be stored by the user device 110, 120 or 130 being used by the user. Alternatively, this preference database may be stored by DNS server 142 or dial-up server 175, for use in determining preferences for a particular user, with the user's login identifier used to select between his viewpoint and viewpoints of other users.

In other embodiments, a viewpoint may be customized for a particular class or category of users rather than for a particular user. In these embodiments, a category or class indicia (instead of a unique user identifier) is associated with preference database 216 or 234 in order to customize that database for use by users belonging to a particular category or class. For example, data representative of users belonging to the class of "sales agents" or "engineers" may be associated with database 216 or 234 so that the viewpoint defined by that database is used for users who are sales agents or engineers, respectively.

Referring to FIG. 6, an exemplary structure of display code database 218 and/or 236 defines different manners in which a hyperlink may be included within an electronic file. Database 218 and/or 236 includes a plurality of records 278-284, each defining a manner by which a hyperlink may be included within a received file. Each record includes a first field 274 for storing the display code for the hyperlink, corresponding to the values in display code field 243 of preference database 216 and/or 234, and a second field 276 for storing data representing the manner in which the hyperlink will be included in the file. For example, if the display code is "1", a hyperlink will be included by converting the matching data pattern into an indication of the hyperlink. If the display code is "2", an indication of the hyperlink will be included as a footnote to the matching data pattern. If the display code is "3", an indication of the hyperlink will be included within a margin adjacent to the matching data pattern. If the display code is "4", an indication of the hyperlink will be included just after the matching data pattern. In each case, the hyperlink will be inserted in association with the matching data pattern.

Other manners of including a hyperlink within a received file may also be used. For example, an indication of a hyperlink could be included within an "on MouseOver" tag. An "on MouseOver" is a JavaScript instruction used for testing the position of a pointer such as a mouse. The hyperlink indication could appear, for example, in a "balloon" window that emerges when the user places a pointer over a data pattern and/or clicks on the data pattern with the pointer.

Referring to FIG. 7, an exemplary structure of user account database 238 includes a plurality of records 296-299, each record having a user identification number field 286, a user name field 288, a user contact information field 290, a user account information field 292, and an accumulated total field 294. Field 286 stores an identifier that uniquely identifies a user. Field 288 stores the user's name. Field 290 stores contact information for the user, such as the user's mailing address, electronic mail address, telephone number, etc. Field 292 stores user account information identifying a financial or other account of the user, such as a credit card account, debit card account, ISP account, telephone account, electronic cash account, etc. Field 294 stores the accumulated total of payments due to the user resulting from the use of the user's preferences. For example, based upon field 254 of record 260 (FIG. 5), Susan Smith (i.e., the user identified by user identification number 58120) will receive $0.25 from the third-party who inserted record 260 into her preference database each time that she activates a hyperlink providing a linkage to "www.bookstore.com" that was included within presented electronic content due to her preference (assuming that field 254 stores an amount to be paid per visit to that resource).

Figure 8A:
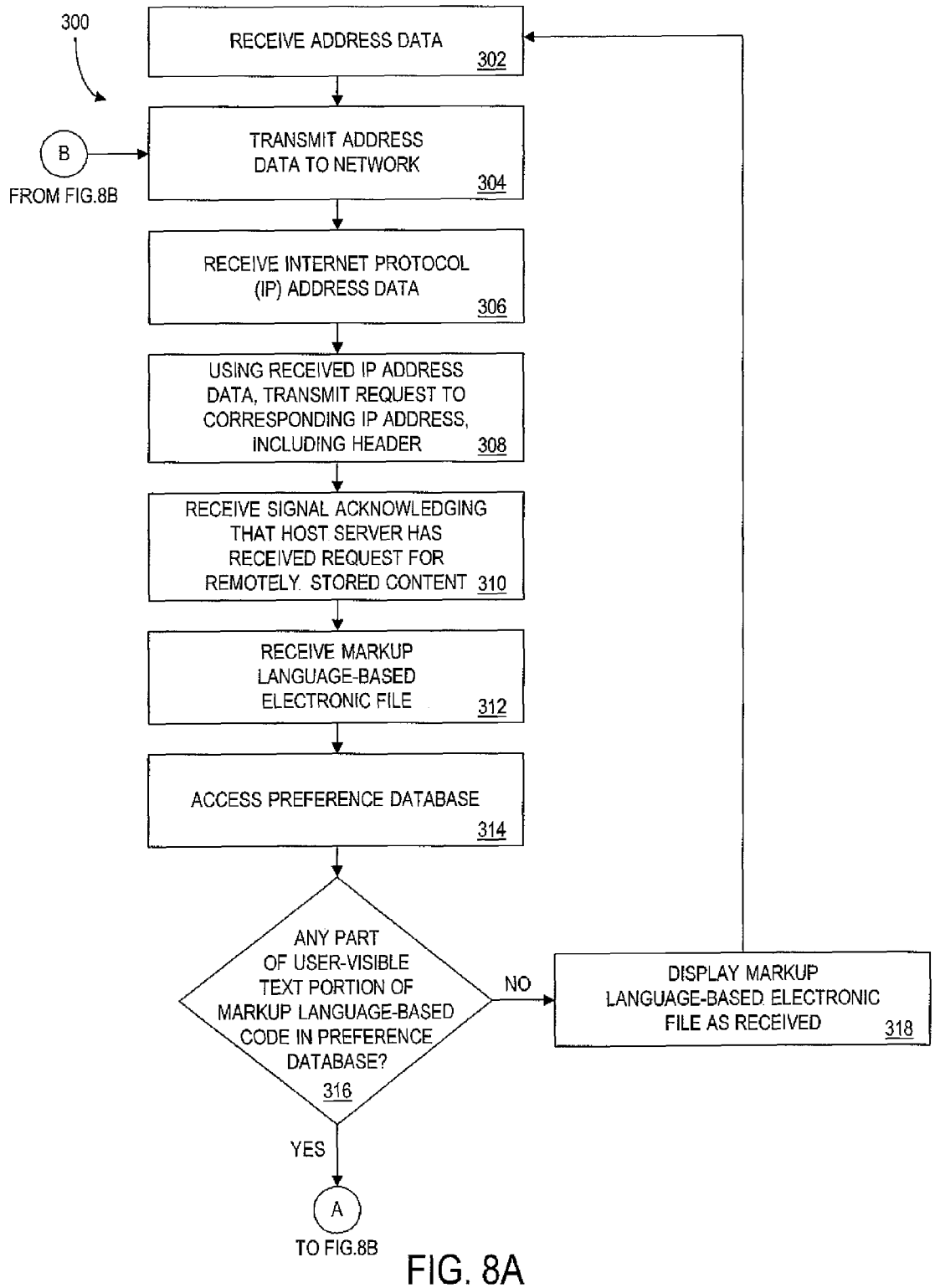
FIGS. 8A and 8B combined are a flow chart of operations performed by the user device of FIG. 3 in modifying requested content.
Figure 8B:
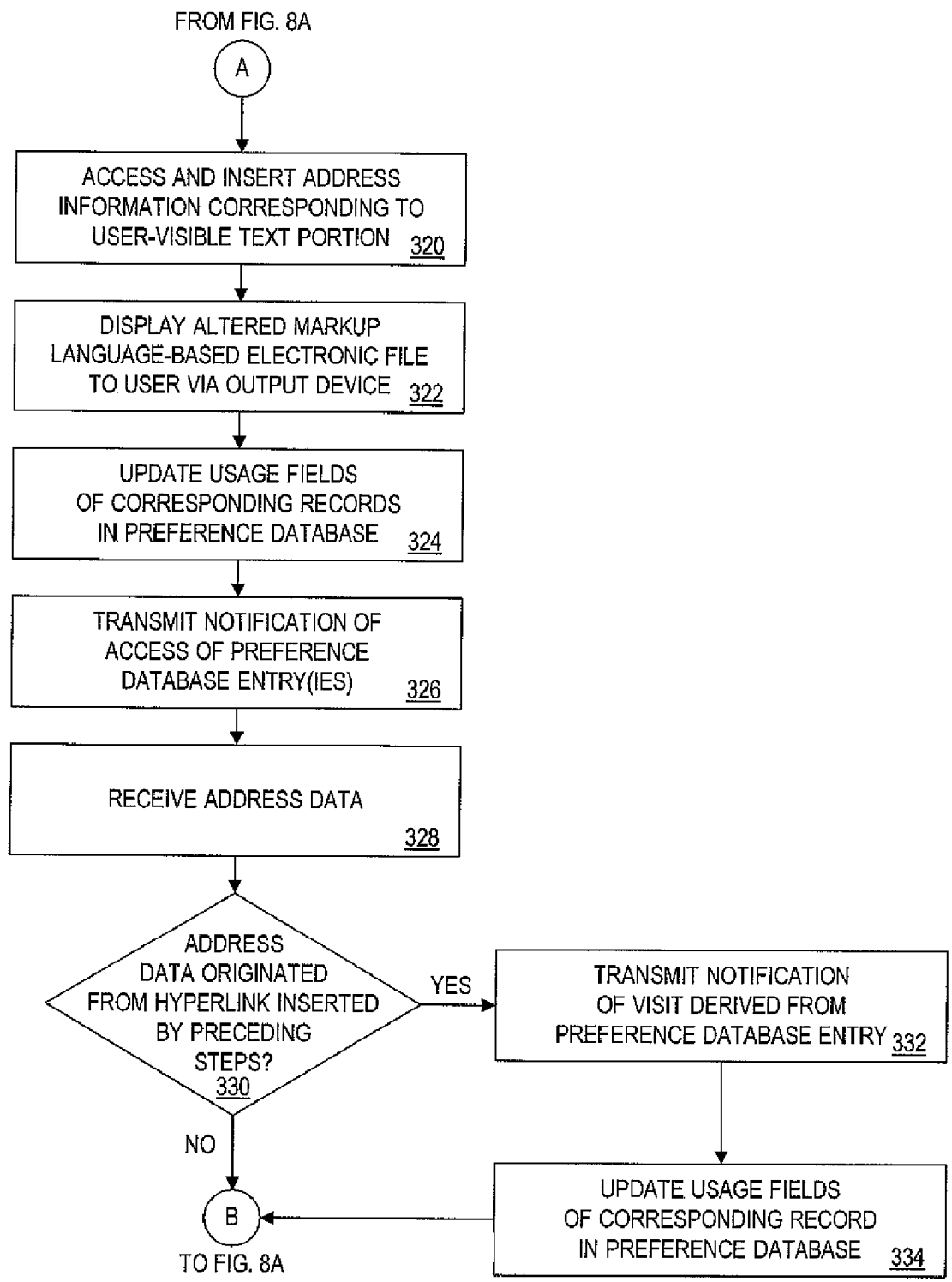

Referring to FIGS. 8A-8B, another embodiment of a method 300 for providing a link in an electronic file being presented to a user is shown. Method 300 is performed by the Web browser of any of user devices 110, 120 or 130 (FIG. 2A or 2B). Similar to method 10, method 300 includes defining a customized viewpoint for the user including a preference for the user (not shown), generating a request for content (steps 302-308), receiving an electronic file corresponding to the request (steps 310-312), and evaluating the electronic file to recognize a match between at least a portion of the file and the data pattern (steps 314-316). If no match is found, method 300 also includes presenting the file to the user without modification (step 318). Upon recognizing a match, method 300 also includes modifying the electronic file to include a link to the computer network resource associated with the matching data pattern (step 320 of FIG. 8B), and presenting the modified file to the user (step 322 of FIG. 8B). As with method 10, the viewpoint may include one or more than one preference, and each preference may provide an association between one or more than one data pattern and a computer network resource. The following description assumes that the user device is user device 110 within network 100 (FIG. 2A). A similar description would apply for user device 120 or 130, and if user device 110 was coupled to network 170 of FIG. 2B.

At step 302, user device 110, operating Web browser 214, receives address data (e.g., a text-based URL or numeric IP address) from a hyperlink embedded into a document being viewed by the user. The address data may include an address corresponding to remotely-stored Web site content. In one embodiment, the address data is received by user device 110 in response to the user initiating a request for content by activating the hyperlink. Alternatively, the address data may be received after the user initiates a request for content by entering the address information into an address bar area of the browser's user interface. In each case, the request is initiated by the user. In another alternative, the address data is received without being initiated by the user. For example, the address data may have been received in response to an automatic refresh function that is being performed by the Web browser, or in response to a default mechanism when the browser is launched (e.g., similar to MSN.COM™).

At step 304, if the address data is in the form of a text-based URL, user device 110 transmits the address data to computer network 100 (FIG. 2A). In computer network 100, this involves transmitting the received address data (i.e., the text-based URL) to DNS server 142 via LAN 132. Alternatively, in computer network 170 (FIG. 2B), step 304 would involve transmitting the received address data to dial-up server 175 via a telephone modem or other communication interface (e.g., DSL or cable modem interface).

At step 306, user device 110 receives the IP address which corresponds to the address data from DNS server 142. Generally, the IP address will be expressed numerically as opposed to being expressed textually. To provide the IP address, DNS server 142 receives the text-based address data that was transmitted by user device 110 at step 304, queries a database for a record which associates the text-based address data to the corresponding IP address, and returns the numeric IP address data to user device 110. Note that steps 304 and 306 may be omitted if the numeric IP address was received at step 302.

At step 308, user device 110 uses the received IP address data to transmit a request to the corresponding host Web server 140 via router 144, the Internet 160, and router 150. The request includes a header (i.e., a numeric code assigned to a request for content identifying a user's unique IP address). Either the LAN 132 or the ISP server assigns a numeric header corresponding to the user device, which is integrated with the numeric IP address information. The numeric IP address information is then transmitted to and received by a router which executes packet-routing software to accurately and efficiently transmit the request for access of the desired content to the appropriate Web server 140.

At step 310, user device 110 receives a signal from the host Web server 140 acknowledging that the host Web server 140 received the request for remotely-stored content. User device 110 may also provide the user with an indication that this signal was received in a status line area of the Web browser interface (e.g., "Web Site Found—Waiting for Reply"). Using the received header information, the host Web server 140 transmitted this signal to user device 110 to indicate that the request for content was received, and input the request to a queue to be addressed sequentially upon fulfillment of other pending requests for access to the desired content. The host Web server 140 may include several computers, including mirror site servers. Alternatively, the host Web server does not transmit such an indication to the user device 110, and device 110 merely waits to receive the requested content.

At step 312, user device 110 receives at least one markup language-based electronic file from the host Web server 140. This file was transmitted by the host Web server 140 after accessing the requested content. This file includes computer-readable code that dictates the formation of the content upon presentation to the user. The code itself may also include URL's associated with supplementary content located on the requested host server, or on a separate host server. The requested content may be delivered completely, or in parts. For example, text and graphic information may be transmitted separately as different is files to be assembled by the user device for presentation to the user. At this point, the requested markup language-based file has been received by user device 110, but has not yet been presented (e.g., displayed) to the user.

At step 314, user device 110, executing Web browser 214, accesses preference database 216, and compares the data patterns 240A-240N stored within preference database 216 with the retrieved electronic file to determine if any portion of the electronic file matches any of the data patterns stored in that database. The preference database 216 may be accessed from local and/or remote storage. In various embodiments, preference database 216 may be integrated with the user's Web browser or, alternately, the LAN or ISP server may be involved in accessing the preference database. As described above, preference database 216 comprises one or more preferences, each preference providing an association between at least one data pattern that may occur in the retrieved content (e.g., in the markup language-based electronic code) and the address information for the corresponding computer network resource (e.g., numeric IP or text-based address data of the computer network resource).

At step 316, user device 110 determines if any portion of the electronic file matches any data pattern stored in preference database 216. In one specific example, user device 110 compares the user-viewable text portion of the markup language-based code that comprises the electronic file with the data patterns 240A-240N stored in preference database 216. The Web browser of user device 110 (in the browser embodiment) or a server at another location (in the server embodiment) compares all of the user-viewable text portions of the markup language-based code with each data pattern in the preference database.

In one embodiment, to recognize a "match", user device 110 requires a portion of the requested content to be the same as a data pattern stored in preference database 216. For example, if a preference in preference database 216 defines data patterns including "jump" and "jumping", a match may be recognized only if one of those data patterns appears in a portion of the requested content. In another embodiment, to recognize a match, user device 110 analyzes the requested content to determine if any portion of that content has a predetermined relationship with a stored data pattern. For example, the predetermined relationship may result in a match being recognized if a portion of the requested content shares a common root with a stored data pattern (e.g., the word "jumped" may be recognized as matching stored data pattern "jump" since they share a common root). Other relationships may also be used to find that a portion of requested content matches a stored data pattern. For example, if the stored data pattern comprises the United States flag, then a portion of the requested content may be found to match the stored data pattern if that portion includes certain combinations of stars and stripes. As another example, if the stored data pattern comprises a graphic, a portion of the requested content may be found to match the stored data pattern if that portion includes more than a predetermined percentage (e.g., 90%) of the same pixels. Thus, a portion of requested content may be recognized as matching a stored data pattern if that portion has a sufficient relationship to the stored data pattern. Various data pattern recognition techniques may be used to determine if a match occurs.

At step 318, if no part of the requested content (e.g., no part of the user-viewable text portion of the markup language-based code) matches a data pattern stored in preference database 216, user device 110 displays the markup language-based file to the user as received (i.e., without modification). If, however, any part of the requested content matches any data pattern stored in the preference database, then processing continues at step 320 of FIG. 5B.

At step 320, user device 110 accesses preference database 216 to determine the address information for any data pattern that was recognized to match user-viewable text in the received file, and inserts a hyperlink to the computer network resource corresponding to that address information into the markup language-based file for subsequent display to the user via the output device(s) 206 of device 110. The hyperlink may be inserted into the file such that an indication of the link will be displayed in association with (e.g., at or substantially adjacent to) the original location of the matching user-viewable text (i.e., the matching data pattern). For example, a hyperlink may be inserted into the file such that, when an indication of the hyperlink is displayed to the user, the hyperlink will be located at or substantially adjacent to the location of the matching data pattern. The indication of the hyperlink will be "substantially adjacent to" the location of the matching data pattern if a user will perceive the hyperlink as being associated with the matching data pattern. Thus, user device 110 (or a separate server) effectively modifies the user-viewable text portion of the markup language-based code to indicate one or more supplemental hyperlinks in accordance with preference database 216.

A retrieved electronic file may be altered to include a hyperlink indication according to the display code stored in field 243 of the record of the corresponding preference. For example, assume that Web browser 214 causes user device 110 to recognize that a portion of text in the user-viewable portion of requested content matches the data pattern "The Committee" stored in field 240N of record 260 in preference database 216. User device 110 may modify the requested content to include a hyperlink for the matching data pattern (e.g., a hyperlink to "www.bookstore.com", based upon field 242 of record 260). Since the display code for this preference is "1", user device 110 will include a hyperlink indication within the requested content by "converting" the matched data pattern into the hyperlink. For example, if the requested content includes the data pattern "The Committee" as plain text, the Web browser may replace this text with a hyperlink which is displayed to the user as "The Committee" so that, if the user then activates this hyperlink, user device 110 will request an electronic file from the associated network resource ("www.bookstore.com").

Alternatively, using a display code, a hyperlink indication may be displayed to a user in association with a matched data pattern by being placed at or adjacent to that data pattern. For example, a hyperlink indication may be placed just after "The Committee" (display code "4"), or just after the end of the sentence containing "The Committee" (e.g., "To purchase this book online, click on www.bookstore.com"). As this example shows, additional text may be inserted in the requested content to describe the hyperlink to the user. This text may be stored in another field (not shown) of preference database 216 or display code database 218, 236. A hyperlink indication may also be displayed at other locations in the requested content that provide an association with the matched pattern. For example, an indication may be placed in a footnote from the matched pattern (display code "2"), or in a margin adjacent to the matched pattern (display code "3").

When a hyperlink associated with a matching data pattern is inserted into requested content, any existing hyperlink in the requested content may, or may not, be overridden with the inserted hyperlink. The Web browser may determine whether an existing hyperlink is present within a user-viewable text portion and, if so, overwrite (or not overwrite) that existing hyperlink with a new hyperlink associated with a matching data pattern. For example, if the original requested content includes: "We recommend 'The Committee'. To purchase this book online, click on www.departmentstore.com", the browser could replace the hyperlink "www.departmentstore.com" with the hyperlink "www.bookstore. com". By activating this hyperlink, the user may then access "www.bookstore.com" in accordance with his or her previously-established viewpoint.

At step 322, the altered markup language-based electronic file is presented (e.g., displayed) to the user via the output device(s) 206 of user device 110. This file includes a hyperlink for the address information stored within preference database 216 for each matching user-viewable text portion of the markup language-based code, as determined above. If the user activates one of these hyperlinks, he or she will access the computer network resource specified by the address information. Thus, additional Web traffic resulting from the display of the altered markup language-based file may be directed to one or more third-party Web sites as dictated by the preference database.

At step 324, user device 110 updates the usage fields for each record of preference database 216 for which a data pattern was found to match a portion of the requested content. In particular, user device 110 updates fields 248 and 250 to reflect the number of times accessed and the number of times accessed since last visit. For example, user device 110 may increment by one the numeric data stored within fields 248 and 250 of each record determined to store a matching data pattern. Fields 248 and 250 are maintained for tracking the number of occurrences of text-based user-viewable content and the display of resultant hyperlinks associated therewith, and may be used to provide data for billing purposes and/or for providing benefits to the user.

At step 326, user device 110 transmits a notification(s) to all of the originators identified by preference database records as having matched data patterns. For each record of the preference database that was accessed in step 320 and used for inserting a hyperlink into content, the originator data in field 246 of the record is used to generate a notification to the originator of the record indicating that the record was used. This notification may or may not trigger an action if the originator was the user or an administrator of the user's organization. If no action is triggered, the notification need not be provided. However, if the originator was a third party that offered compensation or another benefit for the use of associations that were inserted by the third party into the preference database, this notification may be used to trigger payment from the third party to the user or another designated recipient. Alternatively, a coupon may be delivered, or a points value in an incentive program may be incremented, in response to receiving this notification. Other forms of benefit or compensation may also be used by each third-party organization wishing to have records included within the preference database used by a user. In other embodiments, instead of generating a notification to the originator of a record each time that the record is used, data fields 248, 249 and 250 are used to track the usage of each record, and billing/notification is performed afterwards in batches.

In another embodiment, user device 110 transmits a notification to DNS server 142 (FIG. 2A) or dial-up server 175 (FIG. 2B), and that server updates the accumulated total due the user stored in field 294 of user account database 238. This database can later be used to provide payments to the user, and to bill the originator of the preference that caused the link to be inserted.

After step 326, the user will view the modified electronic file that has been presented to the user by the output device(s) of his or her user device 110. Ultimately, the user will close the Web browser, or will initiate a request for additional content by delivering new address data to the browser. Thus, at step 328, the browser may receive new address data from the user, in a similar fashion to that described above with reference to step 302 (FIG. 8A).

At step 330, user device 110 evaluates if the new address data received from the user originated from a hyperlink previously inserted into an electronic file presented to the user via the actions that are described above. If not (e.g., if the user typed a new address into an address box of his or her Web browser, or clicked on a preexisting hyperlink in the retrieved content), then processing continues at step 304 (FIG. 5A) to retrieve the newly-requested content. If, however, the user has clicked on a hyperlink added by the Web browser according to the above-described steps, then user device 110 transmits a notification of the visit derived from the preference database record that was used to generate the hyperlink to the originator of that record, at step 332.

In particular, at step 332, user device 110 accesses the record of the preference database previously accessed at step 320 to obtain the originator information from field 246 of that record, and uses this information to generate a notification to the originator that a visit was initiated by that record. This notification may not be provided if the originator was the user, or was an administrator of the user's organization. If, however, the originator was a third party that offered a benefit (e.g., compensation) for visits initiated by use of the associations inserted by the third party into preference database 216, this notification may trigger providing the benefit from the third party to the user or to another designated recipient. Alternatively, a coupon may be delivered or the number of points in an incentive program (e.g., frequent flyer miles) may be incremented in response to this notification. Other forms of benefits may also be used by each third-party organization wishing to entice visits to particular network resources. In some embodiments, instead of generating a notification to the originator of a record each time a visit is initiated by the record, a data field (as discussed above) is used to track the number of visits initiated by each record (e.g., by being incremented whenever a link that was added using the record is activated), and billing/notification is performed later in batches. As another alternative, the notification may be sent to the DNS server 142 or dial-up server 175 for use in updating the user account database 238 by, for example, incrementing the accumulated total due to the user in field 294.

At step 334, user device 110 updates the usage fields for the corresponding record in the preference database (i.e., the record that was accessed at step 320 to insert the hyperlink). In particular, user device 110 updates (e.g., increments by one) the numeric data stored in field 249 of that record to reflect the user's access of the computer network resource, and resets field 250 (i.e., sets field 250 equal to zero) of that record. The data in field 249 can be used for billing purposes and/or for providing payment to the user. These actions maintain accurate statistics on the use of each record. After step 334, processing continues at step 304 (FIG. 8A) to obtain the newly-requested content.

Referring to FIG. 9, an exemplary method 340 performed by user device 110 for updating preference database 216 based upon a received signal and a monetary value associated with the signal is illustrated. In this manner, an ISP or a user may benefit by allowing preference database 216 to be updated by a third party, such as a merchant, a service provider, or a portal-type Web site. In accordance with method 340, preference database 216 may be implemented using a commonly-accessible "cookie" file. A "cookie" is a set of data created by a Web server and stored on a client system (e.g., a user's computer) which allows a Web site to track a user's patterns and preferences. A "cookie" contains a range of addresses or URLs for which it is valid. When a user's browser encounters one of those URLs again, the browser sends a copy of the cookie to the Web server. Cookies may be used to identify the user computer, to instruct the Web server to transmit a customized version of a Web page, to submit account information for the user, and for other administrative purposes.

Additionally, it is envisioned that the method of FIG. 9 may facilitate the addition of data records to preference database 216 in a manner that does not require any monetary or other benefit "override". The addition of records into preference database 216 may be facilitated merely in response to an absence of certain data patterns within the preference database.

At step 342, user device 110 receives a signal indicating a third party's interest in updating preference database 216. Optionally, the received signal may be received by the Web browser as part of viewing content, in which case the signal may be presented to the user in the form of a text box message or audio prompt for acceptance or decline by the user. The signal may also be received by the user in the form of an electronic mail message including or having a hyperlink leading to an executable script or program (e.g., an applet) for updating the preference database. The signal preferably comprises data including benefit values and an indication of the particular records within the preference database to be updated. Preferably the indication includes data corresponding to one or more portions of user-viewable text. The signal may comprise other data needed to complete a record within the preference database, such as expiration information for the proposed update.

At step 344, user device 110 analyzes the received signal and compares that signal to preference database 216 to determine if there is any conflict between a requested addition to the preference database and a record already existing in that database. This process involves evaluating any data patterns (e.g., user-viewable text portion(s)) identified by the received signal and comparing these data patterns to data patterns 240-240N already existing in the preference database. Any match indicates a possible override of a record already in the preference database. If there are no such overrides, preference database 216 is updated as described below in relation to step 356. If there are one or more potential overrides, processing continues at step 346.

At step 346, user device 10 determines the value of each potential override request. To determine the value, the browser in conjunction with processor 200 examines the received signal to determine the value of the benefit identified by the override signal, and compares the value with a benefit that is identified in field 254 of the existing preference database record.

In an embodiment in which field 254 stores an amount paid per visit, or an amount paid per hyperlink insertion, this analysis may involve the comparison of monetary values. In non-monetary embodiments (e.g., where the benefit is a coupon, discount or points awarded in an incentive program), the browser may access stored information regarding the ranking of benefits to produce an index or ranking of the benefit provided by the existing preference database entry and the benefit offered by the received signal. If sufficient data to perform such a comparison is not available, the Web browser may produce a dialog box for display to the user that provides a comparison of the benefit described by the current preference database entry with the benefit offered by the received signal, and may request that the user identify a comparative ranking or an index value for use in determining which benefit is preferable. The browser can thus develop data for ranking benefits, enabling automatic evaluation of the comparative preference of the user (e.g., frequent flyer miles vs. cash payments, or between frequent flyer miles from different airlines).

At step 348, after the values of potential override requests are determined, user device 110 selects one potential override request. At step 350, user device 110 compares the determined value of the selected potential override request with the benefit per use value stored in field 254 of preference database 216 for the conflicting record that may be overridden by the received signal. If the received signal identifies a greater value, processing proceeds at step 352 and the preference database is updated to reflect the new preference or preferences identified by the received signal (by updating fields 240A-240N and 242), any expiration data for the new preference (by updating field 244), the new originator (by updating field 246), and the new benefit per use (by updating field 254). Usage fields 248-250 and status field 252 are reset to their initial values, and the updating process is complete for that request.

After step 352, or after step 350 if the potential override request has a lower value than the value of the existing preference database record, user device 110 determines at step 354 whether the received signal included any additional override request that should be analyzed. If so, processing returns to step 348 to select one of these additional override requests.

After all of the potential override requests are processed, or if there were no potential override requests, processing proceeds from step 354 to 356. At step 356, preference database 216 is updated to reflect (e.g., by adding) any nonconflicting association(s) identified by the received signal. At this point, method 340 for updating the preference database is complete.

Method 340, as shown in FIG. 9, may automatically update the preference database upon receipt of a signal requesting an update. Alternately, the step of updating the preference database to reflect any new preference(s) may be postponed or canceled based upon a received accept/decline response signal that is generated by the user via user device 110. The user may also individually accept and/or decline each new proposed preference. The Web browser may also be configured to allow the user to select a certain level of involvement that the user desires to have in updating the preference database.

In one embodiment, a user may specify a maximum number of custom hyperlinks that will be allowed to appear within a single electronic file. For example, a user could specify that only one association may be made between a matching data pattern and an associated computer network resource for a given electronic file, even if more than one data pattern within the file matches one of the data patterns stored within preference database 216. The user can thus limit the extent to which requested content can be customized.

In another embodiment, a user may specify that his or her viewpoint may not be modified to contain particular preferences or types of preferences. For example, a user could specify that his or her viewpoint may not be customized by a third-party to include any preferences that provide an association to an adult-oriented Web site, or an organization could specify that the viewpoints used by its members may not be customized by a third-party to include preferences providing an association with any competing organization.

In one embodiment, an originator who wishes to add a new or updated preference to the viewpoint of a user may offer the user a benefit that will be provided to the user if the user agrees to accept the new or updated preference. For example, if a third party wishes to add a new preference to the viewpoint of a user, the potential override request received by user device 110 at step 342 includes an offer, which is presented to the user. The user may then accept or decline the new preference. If the user declines, his or her viewpoint is not changed. If the user accepts, his or her viewpoint is modified to include the new preference, and the user's account is credited with the offered benefit (e.g., by incrementing accumulated total field 294 for the user's record). Based on the terms of the offer, the user may then receive additional payments based upon use of the new or updated preference, as previously described.

To prevent the user from quickly deleting the new preference, the offer to add a new or updated preference may include a condition that must be met for the user to receive the offer amount. For example, the condition may specify a time period during which the new or updated preference must remain in effect, and which cannot be overridden by the user. Alternatively, the condition may specify a minimum number of times that the preference must be accessed and used to insert a hyperlink into received content, or a minimum number of times that the associated computer network resource must be visited, during which the new or updated preference must remain in effect. When a condition is present, the party establishing the preference may (but need not) withhold payment to the user until the condition has been met.

As described above, a third party may pay a user for the right to include one or more preferences within the user's viewpoint, and/or for uses of one or more preferences within the user's viewpoint. Alternatively, any of these payments may be made by a third party to another party who establishes or operates a viewpoint for use by one or more users. For example, an organization may evaluate offers received from third parties for the right to insert preferences in the customized viewpoint that is used by members of that organization. For a specific example, a book club that provides its members with a viewpoint that is customized to include a variety of book-related preferences may determine which preferences to include in the viewpoint based on offers made by online bookstores. If Bookstore1 offers $100.00 for the right to include a preference providing an association to its Web site, and Bookstore2 offers $200.00 for the right to include a preference providing an association to its Web site, the club may decide to accept Bookstore2's offer such that the customized viewpoint will drive the book club's members to Bookstore2's Web site. The club and/or its members then receive additional payments whenever the members use that preference.

Figure 10:
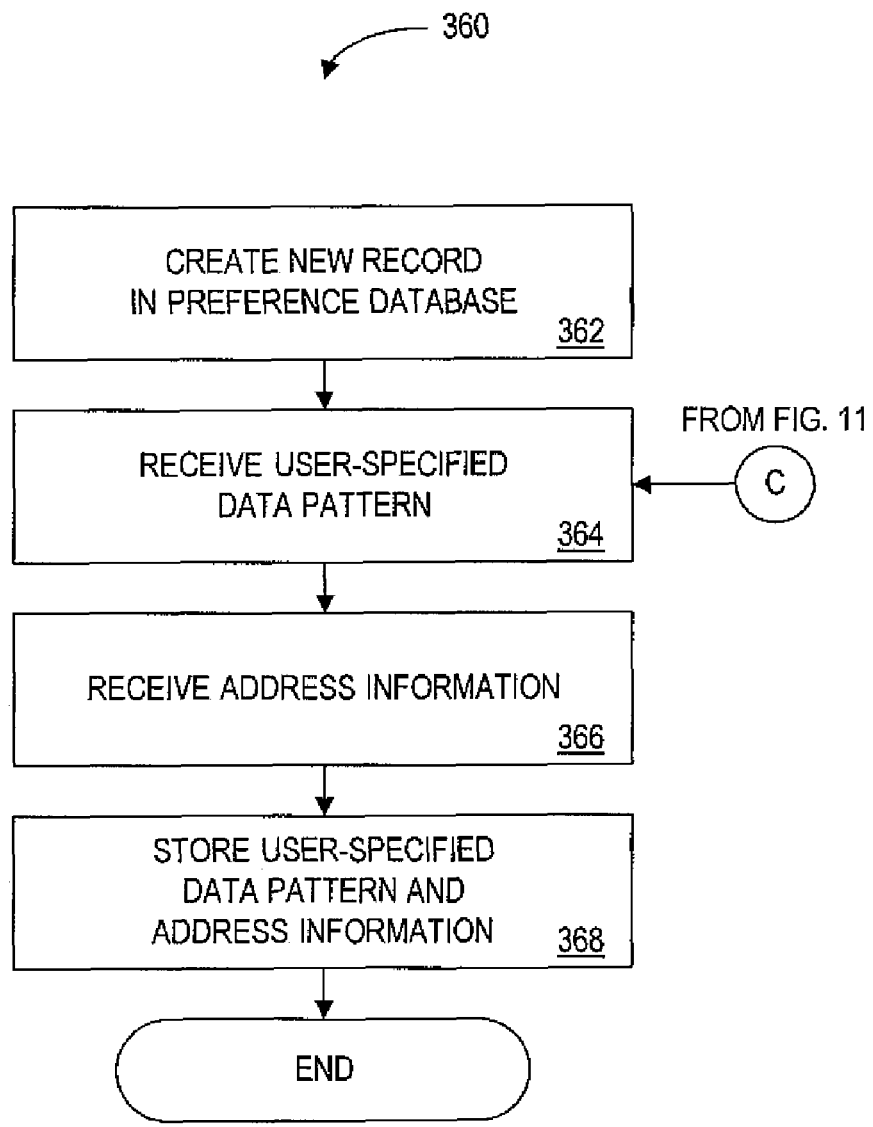
FIG. 10 is a flow chart of an alternative method for updating the preference database in response to a user's manual modifications.

Referring to FIG. 10, an alternative method 360 for updating or populating preference database 216 is performed via maintenance of the Web browser by the user. In method 360, a user specifies one or more data patterns (e.g., user-viewable text portions of markup language-based electronic files), and corresponding address data to be incorporated upon receipt of a markup language-based file including a matching user-viewable text portion. Method 360 may be repeated to add additional records to preference database 216.

At step 362, user device 110 creates a new record in the preference database. At step 364, user device 110 receives one or more data patterns (e.g., user-viewable text) specified by the user, to be used as the one or more data patterns for the new record. At step 366, user device 110 receives and stores address information to be associated with the specified data patterns that are provided by the user. Next, at step 368, the user-specified data patterns and the address information received from the user are stored in the new record of the preference database. Thereafter, the preference database record is available for use according to the process of FIGS. 5A and 5B for the receipt and modification of content.

Figure 11:
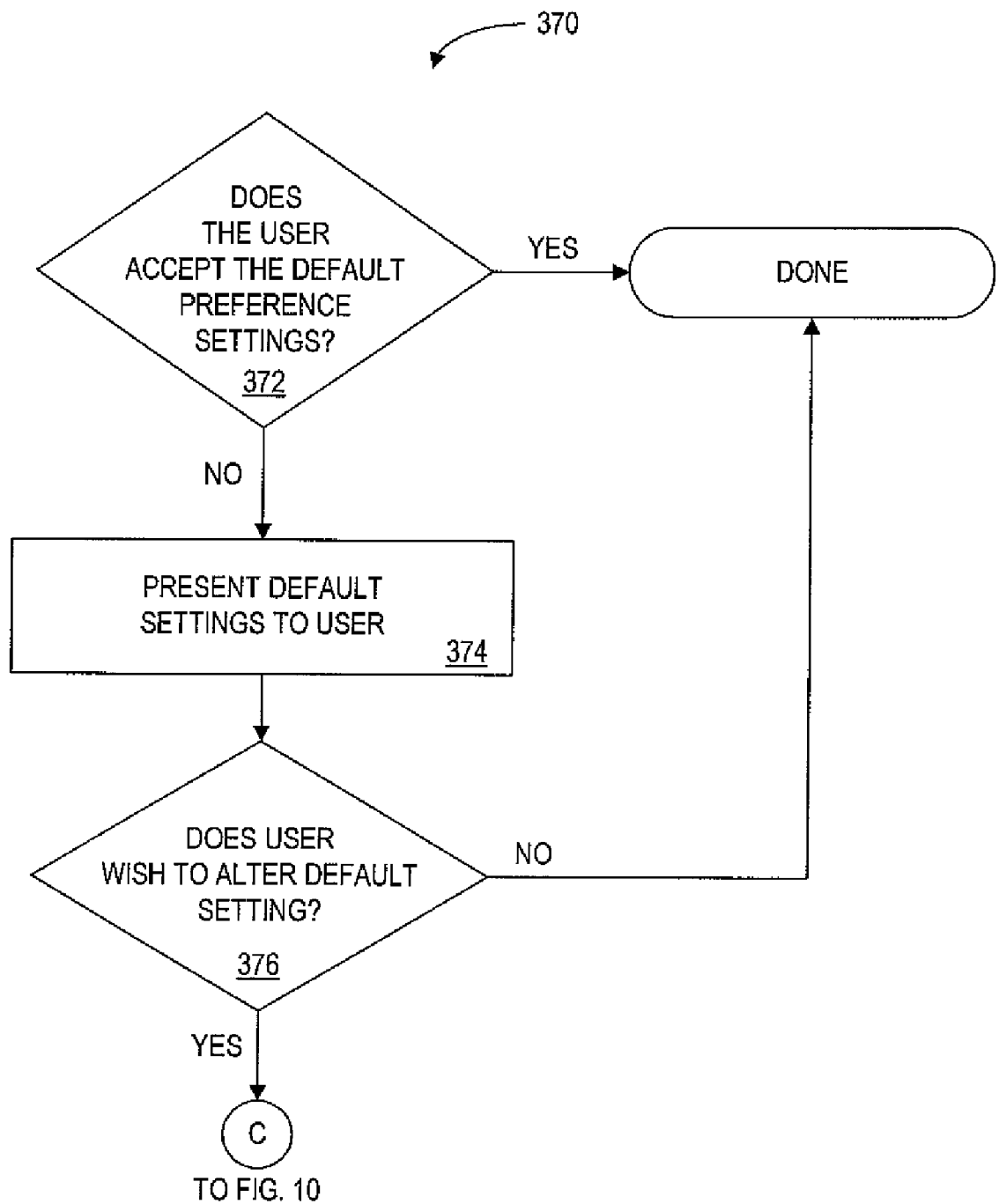
FIG. 11 is a flow chart of an alternative method for updating the preference database of FIG. 5 as part of the installation of a Web browser.

Referring to FIG. 11, still another method 370 for updating or populating the preference database is based upon installation of Web browser 214 by the user. In method 370, upon installation of Web browser 214, a user may accept or reject the default preference settings that were previously stored by the publisher or developer of the Web browser. If the user wishes to reject one or more of the default preference settings, the user, as shown in method 360 (FIG. 10), may manually specify a replacement preference setting.

At step 372, user device 110 provides a user with the option of accepting the default preference settings built into the installation program for the Web browser. If the user accepts the default settings, the process is done. However, if the user rejects the default settings, user device 110 displays the default preference settings to the user using its output device(s) 206 at step 374. At step 376, user device 110 provides the user with the option of modifying any or all of the default preference settings. If the user does not choose to perform any modification, the process is done. However, if the user wants to make one or more modifications, processing continues at step 364 (FIG. 10) to allow the user to manually indicate one or more data patterns and address information.

While the invention has been illustrated by a description of various embodiments and while these embodiments have been described in considerable detail, it is not Applicants' intent to restrict or limit the scope of the appended claims to such detail. Other advantages and modifications will be readily apparent to those of skill in the art. For example, various databases described above may reside, and various functions may be performed, in other locations or via other devices. For example, while user account database 238 has been described as residing in DNS server 142 or dial-up server 175, user account database 238 could also be located within another computer in communication with user devices 110, 120 and 130, such as another server coupled to LAN 132 (FIG. 2A). This server would then receive indications from each user device whenever a payment or other benefit is earned by the respective user, and would update the accumulated total for that user. As another example, while the viewpoint defined by preference database 216 and/or 234 have been described as residing in user device 110, 120 or 130 and/or DNS server 142 or dial-up server 175, the viewpoint could reside at one or more other devices that operate in conjunction with the user's device. For example, a viewpoint may be partially or completely implemented at a user's computer, a device operating with the user's computer (e.g., a firewall, a remotely-accessible library, a router, a server, etc.), or another system.

Alternate Embodiments

In the Web browser embodiment described above, preference database 214 resides within the user's Web browser, and is updated by a third party (e.g., an online merchant) that registers the data patterns, or by the user. Alternatively, instead of interacting directly with users, a merchant (or other third party) who wants to include preferences in a viewpoint may interact with the provider or developer of the Web browser to establish default preferences leading to the Web site of the merchant. In this case, the provider or developer of the Web browser would control updates to the default preference database, and the users' agreement to updates would not be needed. Such preferences would drive Web traffic from content being viewed by users to the merchant's site. For example, a user installing the NETSCAPE NAVIGATOR® browser may be provided with default preferences compiled by Netscape. A user may be required to use these preferences. Alternatively, a user's preferences may be established entirely or partly by the user during installation of the browser, or later, to allow the user to entirely or partly override the default viewpoint.

Further, a user may input his or her own preferences to be associated with content to be viewed later. For example, a user may prefer to do his or her book shopping at a particular Web site. The user could register a preference such that each time the name of his or her favorite author occurs in a user-viewable text portion of a markup language-based document that is being read, a hyperlink to the corresponding bibliography Web page at that Web site would be automatically inserted at the location of the author's name. Thus, a user utilizing a Web browser to view a Web page for a newly published book review may access his or her choice of on-line bookseller simply by clicking on the authors name within the book review document.

In another embodiment, multiple parties may be involved in brokering modifications to a preference database. For example, an ISP such as AMERICA ON-LINE (AOL) may accept competitive bids from multiple on-line merchants who seek to derive traffic from occurrences of data patterns (e.g., words or phrases) in documents presented to users. Once a user logs-on to AOL, the preference database that is stored on the user's hard-drive could be automatically updated by AOL to reflect any newly-registered preferences. Alternatively, the preference database may reside at the user's ISP. In this manner, the results corresponding to the updated preference database may be broadcast or reflected across a large number of user devices, as reflected by the preference database that is centrally-maintained on an ISP server.

The above embodiment may also be implemented and practiced by a portal Web site, such as "YAHOO!®". For example, a portal Web site could create a preference database based upon bids made by online merchants. Then, before the Web site sends any content (e.g., search results, news, email, chat group messages, etc.) to a user, the Web site may include a hyperlink based on that preference database. For example, any Web site user receiving search results containing a data pattern that matches a data pattern stored by one of the preferences may be provided with an inserted hyperlink that leads to a computer network resource that has been associated with that data pattern.

As another example, a news organization (e.g., CNN.com™) could register a number of data patterns relevant to current events with a portal Web site (e.g., "YAHOO!®"). For example, the news organization could register the keywords "Federal Investigation", "Supreme Court decision", "War in Chechnya", etc. Then, whenever any of the registered data patterns is found on the portal Web site, the content could be marked up with a link to the news organization. For example, a link to CNN.com™ could be inserted wherever "Federal investigation" is found on YAHOO!'s content. Thus, users of the portal Web site would be driven to the CNN.com™ site.

In one embodiment, users may be presented with offers made by online merchants or ISPs who seek to derive or influence Web traffic based upon the occurrence of data patterns such as single words or phrases within user-viewable text portions of documents. The users could then accept the offers to receive benefits. In one embodiment, a user who elects to allow his or her personal preferences to be updated by an on-line merchant or ISP may receive a discount, a coupon or another type of benefit. For example, a user who previously indicated his preferred online bookseller is "Bookstore1.com" may be willing to accept a discount, such as 10% off of his first purchase, to allow "Bookstore2.com" (a competitor of "Bookstore1.com") to adjust his personal preferences in its favor. For another example, an ISP may decrease the price that is charged to the user for providing Internet access services in exchange for being allowed to update a preference database associated with the user (e.g., the user may receive a discount of $5.00/month from the normal access rate of $19.95/month). It is also envisioned that a portal Web site may aggregate several preference updates to be presented to a user in a batch.

As noted above, the preference database may reside within the user device as part of the user's Web browser, or may reside remotely (e.g., at a dial-up ISP Server or LAN Server). The preference database may also be stored in cache, thus allowing it to be updated with "cookie" files. In this manner, a Web site may generate and store an indication of the preference database currently associated with a particular user device. The preference database may alternatively reside as a remote library, accessible by the ISP Server, LAN Server, and/or the user device's Web browser program. The preference database may also reside in the RAM of the user device.

As described above, the user device processes retrieved content to include additional hyperlinks. The processing could also occur at another location. For example, the processing may be performed at a LAN server, proxy server or firewall responsible for handling the Internet traffic for the members of an organization. Also, the processing could be performed by a server at an ISP as a value-added service for its customers. Further, the processing may be performed at an Internet site so that all content retrieved via that site would be delivered with appropriate hyperlinks incorporated therein.

In one embodiment, the preference database stores or uses records based upon one or more additional criteria or conditions (e.g., geography) for creating a specific association. For example, a user in New England who is viewing a document including one or more occurrences of the user-viewable text portion "groceries" may be directed to the Web site of a grocer conducting business in New England. The user's geographic location may be determined, for example, from his contact information (e.g., zip code, telephone number, street address, ISP provider, etc.) stored in field 290 of user account database 238. Meanwhile, another user located in Texas viewing the same document may be presented with a link to the Web site of a different grocer conducting business in Texas. This result may be achieved by inserting associations into the request that represent the geographic location of the user. Alternatively, this result could be achieved using geographic information (e.g., zip code) for each preference such that any preferences that are geographically specific to the current location of the user could be preferred over preferences that are not geographically specific to the user's location, or over preferences geographically specific to an area that does not include the location of the user.

In one embodiment, a user may indicate a preference for certain Web sites to be included and/or excluded from his or her preference database by an ISP or by a third-party. For example, a user may indicate that his or her preference database may be updated by an ISP or third party to reflect links for merchants A and B, while excluding links for merchant D. Alternatively, a user may indicate a preference for one or more particular classes of Web sites to be included and/or excluded from his or her preference database. The user-specified preferences could be entered into the database during, for example, a setup or installation routine such as that described in relation to FIGS. 10-11.

In one embodiment, the features of the present invention may be activated and inactivated by a user using a button on the toolbar area of the browser interface. Similar to a "refresh" function, the user could initiate such a "view preferred links" function. In this manner, a user of the disclosed Web browser may view Web content either as intended by the content's authors or publishers, or in accordance with the preference database of the invention.

In a similar embodiment, the hyperlinks corresponding to the user-viewable text portions within retrieved markup language-based electronic files may be displayed separately from the user-viewable text itself. For example, if the user device is a personal computer, the links may appear in a separate area or "frame" of the output screen of the user device. The links may also appear using a different color, font or other attribute. The user may then select whether to activate the original link, if any, or a "preferred" link.

As described above, a Web browser in accordance with an embodiment of the invention can modify an electronic file being presented to a user to include a link to a computer network resource associated with a data pattern matching one of the data patterns stored in a viewpoint. Alternatively, in addition to or in lieu of including such a link, a Web browser can modify an electronic file being presented to a user to include content retrieved from the computer network resource that is associated with the matching data pattern. For example, if a user's viewpoint specifies an association between the data pattern "The Committee" and the URL for an online bookstore, and the user retrieves an electronic file which includes the data pattern "The Committee", the user's Web browser could recognize the match between the data pattern "The Committee" in the electronic file and the viewpoint, then contact the online bookstore to receive content associated with this data pattern (e.g., a book review for the book entitled "The Committee"), and then modify the electronic file being presented to the user to include both the book review for the book "The Committee" and the URL of the online bookstore. The user could then read the book review as part of the electronic file to decide whether to activate the URL of the online bookstore to purchase the book. For another alternative, the viewpoint itself could store content associated with the one or more data patterns of a preference within, for example, another field of the record for that preference. Then, when the data pattern is recognized as being within a received electronic file, the Web browser could modify the file to include the content that is stored in association with that preference.

In another embodiment, a Web browser can modify an electronic file being presented to a user to include a "purchasing link" which, if activated, allows a user to buy a product from a computer network resource without being required to visit that network resource. For example, if a user's viewpoint specifies an association between the data pattern "The Committee" and the URL for an online bookstore, and the user retrieves an electronic file which includes the data pattern "The Committee", the user's Web browser could recognize the match between the data pattern "The Committee" in the electronic file and the viewpoint. In response, the Web browser could modify the electronic file to include a "purchasing link" by, for example, adding a hyperlink stating; "Click here to purchase 'The Committee' for $19.95". By clicking on this hyperlink, the user could purchase "The Committee" via an appropriate message sent by the Web browser to the online bookstore, or could add the book to his or her electronic shopping cart for subsequent purchase.

It is to be understood that the embodiments and variations shown and described herein merely illustrate the principles of this invention and that various modifications may be implemented by those skilled in the art without departing from the scope and the spirit of the invention. For example, while the invention has been illustrated as being implemented using particular computer networks including hardware components such as user devices, domain name servers, dial-up servers, routers, proxy servers and Web servers, the invention could be implemented using other hardware components and/or other interconnections therebetween. Some or all of the network components may be implemented by discrete hardwired components instead of computers. Furthermore, while the above description refers to particular databases, other databases or data structures may be used. Also, while various embodiments of methods in accordance with the invention have been discussed as including specific steps listed in specific orders, the steps may be performed in different combinations and orders. While other modifications will be evident to those of ordinary skill in the art, the present invention is intended to extend to those modifications that nevertheless fall within the scope of the appended claims.

We claim:

1. A computer-implemented method, comprising:
defining, by a device operated by a user, a customized viewpoint for the user that includes a preference for the user, wherein the preference provides an association between a data pattern and a computer network resource, in which the data pattern defines an arrangement of user-viewable text;
locating, by the user device, the data pattern in a first data structure by determining that the arrangement of user-viewable text matches a portion of text in the first data structure;
generating, by the user device, a second data structure including a link indicating the computer network resource associated with the located data pattern, in which generating the second data structure comprises:
inserting into the first data structure a hyperlink associated with a URL of the computer network resource, such that an indication of the hyperlink is included in a balloon window that emerges while a pointer is placed over the located data pattern; and
storing a status indicating whether the association provided by the preference is enabled; and
altering the status of the association in accordance with an offer, from a third party, accepted by the user, wherein the offer comprises an offer to provide the user a benefit having a monetary value in exchange for the user agreeing to include the preference in the customized viewpoint for a predetermined period of time.

2. The method of claim 1, further comprising receiving an instruction from the user to disable the association provided by the preference.

3. The method of claim 1, further comprising receiving an instruction from the user to enable the association provided by the preference.

4. The method of claim 1, further comprising receiving an instruction from the third party to disable the association provided by the preference.

5. The method of claim 1, further comprising receiving an instruction from the third party to enable the association provided by the preference.

6. The method of claim 1, further comprising:
determining the status based on an instruction received from the user; and
receiving an instruction from the third party to override the determined status.

7. The method of claim 1, in which altering the status comprises disabling the preference after the predetermined period of time.

8. A computer-implemented method comprising:
defining, by a device operated by a user, a customized viewpoint for the user that includes a preference for the user, wherein the preference provides an association between a data pattern and a computer network resource, in which the data pattern defines an arrangement of user-viewable text;
locating, by the user device, the data pattern in a first data structure by determining that the arrangement of user-viewable text matches a portion of text in the first data structure;
generating, by the user device, a second data structure including a link indicating the computer network resource associated with the located data pattern, in which generating the second data structure comprises:
inserting into the first data structure a hyperlink associated with a URL of the computer network resource, such that an indication of the hyperlink is included in a balloon window that emerges while a pointer is placed over the located data pattern; and
storing a status indicating whether the association provided by the preference is enabled; and
altering the status of the association in accordance with an offer, from a third party, accepted by the user, wherein the offer comprises an offer provide the user a benefit having a monetary value in exchange for the user agreeing to include the preference in the customized viewpoint until a predetermined number of hyperlinks are generated using the preference.

9. The method of claim 1, further comprising deleting the preference when the association has been made a predetermined number of times.

10. The method of claim 1, further comprising disabling the association when the association has been made a predetermined number of times.

11. The method of claim 1, further comprising altering the status when the association has been made a predetermined number of times.

12. The method of claim 1, further comprising disabling the association when the link to the computer network resource has been activated to access the computer network resource a predetermined number of times.

13. The method of claim 1, further comprising altering the status when the link to the computer network resource has been activated to access the computer network resource a predetermined number of times.

14. The method of claim 1, further comprising:
receiving an authorization to adjust the status of the association; and
altering the status based upon the authorization.

15. The method of claim 1, further comprising altering the status as a function of time.

16. The method of claim 1, further comprising storing an indication of a total number of times the preference has been accessed.

17. The method of claim 1, further comprising storing an indication of a number of times the preference has been accessed since the user last activated a link that was generated using that preference.

18. The method of claim 1, in which the balloon window emerges in response to the pointer being placed over the located data pattern.

19. The method of claim 1, in which the balloon window emerges if the located data pattern is clicked on using the pointer.

20. A computer readable memory storing instructions configured to direct a processor to:
define a customized viewpoint for a user that includes a preference for the user, wherein the preference provides an association between a data pattern and a computer network resource, in which the data pattern defines an arrangement of user-viewable text;

locate the data pattern in the first data structure by determining that the arrangement of user-viewable text matches a portion of text in the first data structure;

generate a second data structure including a link indicating the computer network resource associated with the located data pattern, in which the instructions for generating the second data structure comprise instructions configured to direct the processor to:

insert into the first data structure a hyperlink associated with a URL of the computer network resource, such that an indication of the hyperlink is included in a balloon window that emerges while a pointer is placed over the located data pattern; and store a status indicating whether the association provided by the preference is enabled; and alter the status of the association in accordance with an offer, from a third party, accepted by the user, wherein the offer comprises an offer to provide the user a benefit having a monetary value in exchange for the user agreeing to include the preference in the customized viewpoint for a predetermined period of time.

21. The computer readable medium of claim 20, further comprising instructions configured to direct the processor to receive an instruction to disable the association provided by the preference.

22. The computer readable medium of claim 20, further comprising instructions configured to direct the processor to receive an instruction to enable the association provided by the preference.

23. The computer readable medium of claim 20, further comprising instructions configured to direct the processor to:
determine the status based on an instruction received from the user; and
receive an instruction from the third party to override the determined status.

24. The computer readable medium of claim 20, in which the instructions for altering the status comprise instructions configured to direct the processor to disable the preference after a predetermined period of time.

25. The computer readable medium of claim 20, further comprising instructions configured to direct the processor to delete the preference when the association has been made a predetermined number of times.

26. The computer readable medium of claim 20, further comprising instructions configured to direct the processor to disable the preference when the association has been made a predetermined number of times.

27. The computer readable medium of claim 20, further comprising instructions configured to direct the processor to alter the status when the association has been made a predetermined number of times.

28. The computer readable medium of claim 20, further comprising instructions configured to direct the processor to disable the association when the link to the computer network resource has been activated to access the computer network resource a predetermined number of times.

29. The computer readable medium of claim 20, further comprising instructions configured to direct the processor to alter the status when the link to the computer network resource has been activated to access the computer network resource a predetermined number of times.

30. The computer readable medium of claim 20, further comprising instructions configured to direct the processor to:
receive an authorization to adjust the status of the association; and
alter the status based upon the authorization.

31. The computer readable medium of claim 20, further comprising instructions configured to direct the processor to alter the status as a function of time.

32. The computer readable medium of claim 20, further comprising instructions configured to direct the processor to store an indication of a total number of times the preference has been accessed.

33. The computer readable medium of claim 20, further comprising instructions configured to direct the processor to store an indication of a number of times the preference has been accessed since the user last activated a link that was generated using that preference.

34. An apparatus comprising:
a processor; and
a data storage device coupled to the processor, wherein the data storage device stores Web browser software and stores instructions configured to direct the processor to:
define a customized viewpoint for a user that includes a preference for the user, wherein the preference provides an association between a data pattern and a computer network resource, in which the data pattern defines an arrangement of user-viewable text;
locate the data pattern in the first data structure by determining that the arrangement of user-viewable text matches a portion of text in the first data structure;
generate a second data structure including a link indicating the computer network resource associated with the located data pattern, in which the instructions for generating the second data structure comprise instructions configured to direct the processor to:
insert into the first data structure a hyperlink associated with a URL of the computer network resource, such that an indication of the hyperlink is included in a balloon window that emerges while a pointer is placed over the located data pattern; and
store a status indicating whether the association provided by the preference is enabled; and
alter the status of the association in accordance with an offer, from a third party, accepted by the user, wherein the offer comprises an offer to provide the user a benefit having a monetary value in exchange for the user agreeing to include the preference in the customized viewpoint for a predetermined period of time.

35. A computer-implemented method of brokering modifications to a preference database, the method comprising:
receiving, by a device operated by a user, a first competitive bid from a first on-line merchant to define a preference that associates the first on-line merchant with a pattern of user-viewable text for a Web site;
receiving, by the user device, a second competitive bid from a second on-line merchant to define a preference that associates the second on-line merchant with the pattern of user-viewable text for the Web site;
accepting, by the user device, one of the first competitive bid and the second competitive bid;
defining, by the user device, a preference that associates the pattern of user-viewable text for the Web site with the respective on-line merchant corresponding to the accepted competitive bid;
updating, by the user device, a preference database based on the defined preference;
receiving, by the user device, a request from the user to retrieve electronic content of the Web site, in which the electronic content comprises a user-viewable portion;
determining, by the user device, that a portion of the user-viewable portion matches the pattern of user-viewable text;

modifying, by the user device, the electronic content to include an HTML hyperlink to a computer network resource that is associated with the respective on-line merchant, in which the HTML hyperlink is included substantially at the location of the matched portion of the user-viewable text portion; and presenting, by the user device, the modified electronic content to the user, such that the hyperlink appears to the user in place of the portion of the user- viewable portion that matches the matched pattern.

36. The method of claim 35, in which the preference database is stored at a computer of the user.

37. The method of claim 35, in which the preference database is stored at a computer of the Web site.

38. The method of claim 35, in which the preference database is stored at a computer of an internet service provider.

39. The method of claim 35, in which the Web site is a portal Web site.

40. The method of claim 35, in which the electronic content comprises search results.

41. The method of claim 35, in which the electronic content comprises news.

42. The method of claim 35, in which the electronic content comprises email.

43. The method of claim 35, in which the electronic content comprises chat messages.

44. A computer readable memory storing instructions configured to direct a processor to:
  receive a first competitive bid from a first on-line merchant to define a preference that associates the first on-line merchant with a pattern of user-viewable text for a Web site;
  receive a second competitive bid from a second on-line merchant to define a preference that associates the second on-line merchant with the pattern of user-viewable text for the Web site;
  accept one of the first competitive bid and the second competitive bid;
  define a preference that associates the pattern of user-viewable text for the Web site with the respective on-line merchant corresponding to the accepted competitive bid;
  update a preference database based on the defined preference;
  receive a request from the user to retrieve electronic content of the Web site, in which the electronic content comprises a user-viewable portion;
  determine that a portion of the user-viewable portion matches the pattern of user-viewable text;
  modify the electronic content to include an HTML hyperlink to a computer network resource that is associated with the respective on-line merchant, in which the HTML hyperlink is included substantially at the location of the matched portion of the user-viewable text portion; and
  present the modified electronic content to the user, such that the hyperlink appears to the user in place of the portion of the user-viewable portion that matches the matched pattern.

45. The computer readable medium of claim 44, in which the instructions for updating the preference database comprise instructions configured to direct the processor to store the preference database at a computer of the user.

46. The computer readable medium of claim 44, in which the instructions for updating the preference database comprise instructions configured to direct the processor to store the preference database at a computer of the Web site.

47. The computer readable medium of claim 44, in which the instructions for updating the preference database comprise instructions configured to direct the processor to store the preference database at a computer of an internet service provider.

48. An apparatus comprising:
  a processor; and
  a data storage device coupled to the processor, wherein the data storage device stores Web browser software and stores instructions configured to direct the processor to:
    receive a first competitive bid from a first on-line merchant to define a preference that associates the first on-line merchant with a pattern of user-viewable text for a Web site;
    receive a second competitive bid from a second on-line merchant to define a preference that associates the second on-line merchant with the pattern of user-viewable text for the Web site;
    accept one of the first competitive bid and the second competitive bid;
    define a preference that associates the pattern of user-viewable text for the Web site with the respective on-line merchant corresponding to the accepted competitive bid;
    update a preference database based on the defined preference;
    receive a request from the user to retrieve electronic content of the Web site, in which the electronic content comprises a user-viewable portion;
    determine that a portion of the user-viewable portion matches the pattern of user-viewable text;
    modify the electronic content to include an HTML hyperlink to a computer network resource that is associated with the respective on-line merchant, in which the HTML hyperlink is included substantially at the location of the matched portion of the user-viewable text portion; and
    present the modified electronic content to the user, such that the hyperlink appears to the user in place of the portion of the user-viewable portion that matches the matched pattern.

49. A computer readable memory storing instructions configured to direct a processor to:
  define a customized viewpoint for a user that includes a preference for the user, wherein the preference provides an association between a data pattern and a computer network resource, in which the data pattern defines an arrangement of user-viewable text;
  locate the data pattern in a first data structure by determining that the arrangement of user-viewable text matches a portion of text in the first data structure;
  generate a second data structure including a link indicating the computer network resource associated with the located data pattern, in which a generating of the second data structure comprises:
    inserting into the first data structure a hyperlink associated with a URL of the computer network resource, such that an indication of the hyperlink is included in a balloon window that emerges while a pointer is placed over the located data pattern; and
    storing a status indicating whether the association provided by the preference is enabled; and
  alter the status of the association in accordance with an offer, from a third party, accepted by the user, wherein the offer comprises an offer provide the user a benefit having a monetary value in exchange for the user agreeing to include the preference in the customized viewpoint until a predetermined number of hyperlinks are generated using the preference.

50. An apparatus comprising:

a processor; and a data storage device coupled to the processor, wherein the data storage device stores Web browser software and stores instructions configured to direct the processor to:

define a customized viewpoint for a user that includes a preference for the user, wherein the preference provides an association between a data pattern and a computer network resource, in which the data pattern defines an arrangement of user-viewable text;

locate the data pattern in a first data structure by determining that the arrangement of user-viewable text matches a portion of text in the first data structure;

generate a second data structure including a link indicating the computer network resource associated with the located data pattern, in which a generating of the second data structure comprises:

inserting into the first data structure a hyperlink associated with a URL of the computer network resource, such that an indication of the hyperlink is included in a balloon window that emerges while a pointer is placed over the located data pattern; and storing a status indicating whether the association provided by the preference is enabled; and alter the status of the association in accordance with an offer, from a third party, accepted by the user, wherein the offer comprises an offer provide the user a benefit having a monetary value in exchange for the user agreeing to include the preference in the customized viewpoint until a predetermined number of hyperlinks are generated using the preference.

* * * * *

Disclaimer

7,933,893 B2 — Jay S. Walker, Ridgefield, CT (US); Daniel E. Tedesco, Huntington, CT (US); John M. Packes, Hawthorne, NY (US); Stephen C. Tulley, Monroe, CT (US); Kieth Bemer, Pittsburgh, PA (US); Dean P. Alderucci, Westport, CT (US); Marc D. Kessman, Pound Ridge, NY (US); James A. Jorasch, New York, NY (US). METHOD AND SYSTEM FOR PROVIDING A LINK IN AN ELECTRONIC FILE BEING PRESENTED TO A USER. Patent dated April 26, 2011. Disclaimer filed September 4, 2015, by the assignee, Inventor Holdings, LLC.

Hereby disclaims complete claim 44 of said patent.

*(Official Gazette, November 17, 2015)*

US007933893C1

(12) INTER PARTES REEXAMINATION CERTIFICATE (1225th)

United States Patent
Walker et al.

(10) Number: US 7,933,893 C1
(45) Certificate Issued: Jan. 26, 2016

(54) METHOD AND SYSTEM FOR PROVIDING A LINK IN AN ELECTRONIC FILE BEING PRESENTED TO A USER

(75) Inventors: Jay S. Walker, Ridgefield, CT (US); Daniel E. Tedesco, Huntington, CT (US); John M. Packes, Hawthorne, NY (US); Stephen C. Tulley, Monroe, CT (US); Kieth Bemer, Pittsburgh, PA (US); Dean P. Alderucci, Westport, CT (US); Marc D. Kessman, Pound Ridge, NJ (US); James A. Jorasch, New York, NY (US)

(73) Assignee: WALKER DIGITAL, LLC, Stamford, CT (US)

Reexamination Request:
No. 95/002,280, Sep. 14, 2012

Reexamination Certificate for:
Patent No.: 7,933,893
Issued: Apr. 26, 2011
Appl. No.: 11/421,669
Filed: Jun. 1, 2006

Disclaimer of Claim 44
Filed: Sep. 4, 2015 (1420 O.G. 190)

Related U.S. Application Data

(63) Continuation of application No. 11/267,873, filed on Nov. 4, 205, now abandoned, which is a continuation-in-part of application No. 09/606,422, filed on Jun. 29, 2000, now abandoned.

(60) Provisional application No. 60/202,390, filed on May 8, 2000.

(51) Int. Cl.
G06F 7/00 (2006.01)
G06Q 30/02 (2012.01)
G06F 17/30 (2006.01)

(52) U.S. Cl.
CPC .......... *G06Q 30/02* (2013.01); *G06F 17/30855* (2013.01); *G06F 17/30867* (2013.01); *G06F 17/30882* (2013.01); *Y10S 707/944* (2013.01)

(58) Field of Classification Search
None
See application file for complete search history.

(56) References Cited

To view the complete listing of prior art documents cited during the proceeding for Reexamination Control Number 95/002,280, please refer to the USPTO's public Patent Application Information Retrieval (PAIR) system under the Display References tab.

*Primary Examiner* — Joshua Campbell

(57) ABSTRACT

A method for providing a link in an electronic file being presented to a user which includes defining a customized viewpoint for the user. The viewpoint includes a preference for the user that provides an association between a data pattern and a computer network resource. The method also includes generating a request for content, receiving an electronic file in response to the request, and evaluating the electronic file to recognize a match between at least one portion of the electronic file and the data pattern. Upon recognizing a match, the electronic file is modified to include a link to the computer network resource associated with the matching data pattern, and the modified electronic file is presented to the user. Thus, the link included in the electronic file presented to the user is customized for the user, and different users who retrieve the same content can be provided with links to different computer network resources depending on their respective viewpoints.

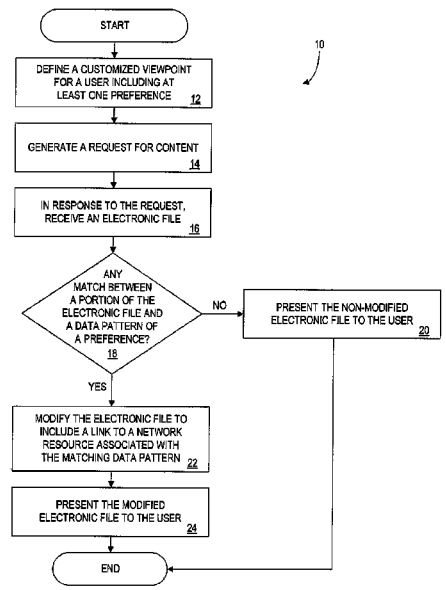

INTER PARTES REEXAMINATION CERTIFICATE

THE PATENT IS HEREBY AMENDED AS INDICATED BELOW.

AS A RESULT OF REEXAMINATION, IT HAS BEEN DETERMINED THAT:

Claim 44 is now disclaimed.
Claims 1-43 and 45-50 were not reexamined.

* * * * *